(12) United States Patent
Ma et al.

(10) Patent No.: US 12,058,378 B2
(45) Date of Patent: Aug. 6, 2024

(54) ENCODER, A DECODER AND CORRESPONDING METHODS

(71) Applicant: Huawei Technologies Co., Ltd., Guangdong (CN)

(72) Inventors: Xiang Ma, Moscow (RU); Haitao Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 153 days.

(21) Appl. No.: 17/852,903

(22) Filed: Jun. 29, 2022

(65) Prior Publication Data

US 2022/0337881 A1 Oct. 20, 2022

Related U.S. Application Data

(63) Continuation of application No. PCT/CN2020/141139, filed on Dec. 30, 2020.

(30) Foreign Application Priority Data

Dec. 31, 2019 (WO) ................ PCT/CN2019/130581
Jan. 2, 2020 (WO) ................ PCT/CN2020/070155

(51) Int. Cl.
*H04N 19/70* (2014.01)
*H04N 19/117* (2014.01)
(Continued)

(52) U.S. Cl.
CPC .......... *H04N 19/70* (2014.11); *H04N 19/117* (2014.11); *H04N 19/172* (2014.11); *H04N 19/174* (2014.11); *H04N 19/186* (2014.11)

(58) Field of Classification Search
None
See application file for complete search history.

(56) References Cited

U.S. PATENT DOCUMENTS

2012/0207227 A1 8/2012 Tsai et al.
2013/0188686 A1 7/2013 Tourapis
(Continued)

FOREIGN PATENT DOCUMENTS

CA     3042287 A1    7/2018
CN   103096047 A    5/2013
(Continued)

OTHER PUBLICATIONS

JVET-Q0358, Xiang Ma et al, AHG9: Constraints on ALF APS, Joint Video Experts Team (JVET) of ITU-T SG 16 WP 3 and ISO/IEC JTC 1/SC 29/WG 11, 17th Meeting: Brussels, BE Jan. 7-17, 2020, 4 pages (Year: 2020).*
(Continued)

*Primary Examiner* — Stuart D Bennett
(74) *Attorney, Agent, or Firm* — WOMBLE BOND DICKINSON (US) LLP

(57) ABSTRACT

The present disclosure provides a method of decoding a coded video bitstream, the method comprising: obtaining a picture-level syntax element included in a picture header of the current picture by parsing the video bitstream, wherein the picture-level syntax element is used to specify whether an adaptive loop filter (ALF) is enabled for the current picture; in case that the picture-level syntax element specifies the adaptive loop filter is enabled for the current picture, obtaining a parameter set identifier included in the picture header, wherein the parameter set identifier is used to indicate a first parameter set comprising a set of ALF parameters, and wherein a temporal identifier of the first parameter set is less than or equal to a temporal identifier of the current picture; performing the adaptive loop filter on at least one slice of the current picture based on the first parameter set.

11 Claims, 12 Drawing Sheets

(51) Int. Cl.
  *H04N 19/172* (2014.01)
  *H04N 19/174* (2014.01)
  *H04N 19/186* (2014.01)

(56) References Cited

U.S. PATENT DOCUMENTS

2013/0343465 A1 12/2013 Chen et al.
2018/0115787 A1 4/2018 Koo et al.

FOREIGN PATENT DOCUMENTS

| CN | 103210650 A | 7/2013 |
| CN | 104584557 A | 4/2015 |
| CN | 109076218 A | 12/2018 |
| RU | 2653236 C2 | 5/2018 |
| WO | 2019069968 A1 | 4/2019 |

OTHER PUBLICATIONS

Document: JVET-O0288-v1, Olena Chubach et al, CE5-related: On the syntax constraints of ALF APS, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Document: JCTVC-F747, Stephan Wenger et al, Adaptive Slice Parameter Set (APS), Joint Collaborative Team on Video Coding (JCT-VC) of ITU-T SG16 WP3 and ISO/IEC JTC1/SC29/WG 11, 6th Meeting: Torino, IT, Jul. 14-22, 2011, 8 pages.

Document: JVET-Q0355, Xiang Ma et al, AHG8/AHG9: Cleanup on multi-layer coding, Joint Video Experts Team (JVET) of ITU-T SG 16 WP 3 and ISO/IEC JTC 1/SC 29/WG 11, 17th Meeting: Brussels, BE, Jan. 7-17, 2020, 3 pages.

Document: JVET-Q0358, Xiang Ma et al, AHG9: Constraints on ALF APS, Joint Video Experts Team (JVET) of ITU-T SG 16 WP 3 and ISO/IEC JTC 1/SC 29/WG 11, 17th Meeting: Brussels, BE, Jan. 7-17, 2020, 4 pages.

Document: JVET-P2001-v8, Benjamin Bross et al, Versatile Video Coding (Draft 7), Joint Video Experts Team (JVET) of ITU-T SG 16 WP 3 and ISO/IEC JTC 1/SC 29/WG11, 16th Meeting: Geneva, CH, Oct. 1-11, 2019, 473 pages.

Document: JVET-Q0359, Xiang Ma et al, AHG12: Constraints on tile signaling, Joint Video Experts Team (JVET) of ITU-T SG 16 WP 3 and ISO/IEC JTC 1/SC 29/WG 11, 17th Meeting: Brussels, BE, Jan. 7-17, 2020, 3 pages.

Rickard Sj berg et al, Overview of HEVC High-Level Syntax and Reference Picture Management, IEEE Transactions On Circuits and Systems for Video Technology, vol. 22, No. 12, Dec. 2012, 13 pages.

ITU-T H.264(Jun. 2019), Series H: Audiovisual and Multimedia Systems, Infrastructure of audiovisual services-Coding of moving video, Advanced video coding for generic audiovisual services, total 836 pages.

ITU-T H.265(Jun. 2019), Series H: Audiovisual and Multimedia Systems, Infrastructure of audiovisual services-Coding of moving video, High efficiency video coding, total 696 pages.

\* cited by examiner

ENCODER, A DECODER AND CORRESPONDING METHODS

CROSS-REFERENCE TO RELATED APPLICATIONS

This application is a continuation of International Application No. PCT/CN2020/141139, filed on Dec. 30, 2020, which claims priority to International Patent Application No. PCT/CN2020/070155, filed on Jan. 2, 2020 and International Patent Application No. PCT/CN2019/130581, filed on Dec. 31, 2019. All of the aforementioned patent applications are hereby incorporated by reference in their entireties.

TECHNICAL FIELD

Embodiments of the present application (disclosure) generally relate to the field of picture processing and more particularly to high-level syntax elements.

BACKGROUND

Video coding (video encoding and decoding) is used in a wide range of digital video applications, for example, broadcast digital TV, video transmission over the internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further embodiments are apparent from the dependent claims, the description and the figures.

According to a first aspect, an embodiment of the disclosure relates to a method for decoding of a video bitstream implemented by a decoding device, wherein the video bitstream includes data representing a current picture, the decoding method comprising: obtaining a picture-level syntax element included in a picture header of the current picture by parsing the video bitstream, wherein the picture-level syntax element is used to specify whether an adaptive loop filter (ALF) is enabled for the current picture; in case that the picture-level syntax element specifies the adaptive loop filter is enabled for the current picture, obtaining an parameter set identifier included in the picture header, wherein the parameter set identifier is used to indicate a first parameter set comprising a set of ALF parameters, and wherein a temporal identifier of the first parameter set is less than or equal to a temporal identifier of the current picture; performing the adaptive loop filter on at least one slice of the current picture based on the first parameter set.

The picture header is a syntax structure containing syntax elements that apply to all slices of a coded picture. A syntax structure is zero or more syntax elements present together in the bitstream in a specified order, and a syntax element is an element of data represented in the bitstream.

The first parameter set is an adaptation parameter set (APS) which is a syntax structure.

The current picture is a coded picture contained in a picture unit (PU), wherein the PU is set of NAL units that are associated with each other according to a specified classification rule, are consecutive in decoding order.

A network abstraction layer (NAL) unit is syntax structure containing an indication of the type of data to follow and bytes containing that data or part of data of the current picture, the picture header or the parameter set comprising a set of ALF parameter. Wherein each NAL unit has a temporal identifier.

If the temporal identifier of a first NAL unit is less than the temporal identifier of a second NAL unit of the same layer, data encapsulated by the first NAL unit may be decoded without reference to data encapsulated by the second NAL unit. The temporal identifier could be also used in sub-bitstream extraction process, which is a process by which NAL units in a bitstream that do not belong to a target set, determined by a target highest temporal identifier, are removed from the bitstream, with the output sub-bitstream consisting of the NAL units in the bitstream that belong to the target set. Therefore, a temporal identifier of the first parameter set is less than or equal to a temporal identifier of the current picture can enable referencing the first parameter set when decoding the current picture, or enable sub-bitstream extraction process for the current picture.

A temporal identifier could be related to a decoding order.

In an embodiment, the performing the adaptive loop filter on at least one slice of the current picture based on the first parameter set comprises: performing adaptive loop filter on the luma component of at least one slice of the current picture based on the first parameter set.

In an embodiment, the method further comprises: in case that the picture-level syntax element specifies the adaptive loop filter is enabled for the current picture, obtain another parameter set identifier included in the picture header, wherein the parameter set identifier is used to indicate a second parameter set comprising a set of ALF parameters, and wherein a temporal identifier of the second parameter set is less than or equal to a temporal identifier of the current picture; performing adaptive loop filter on the chroma component of at least one slice of the current picture based on the second parameter set.

The second parameter set is an adaptation parameter set (APS) which is a syntax structure.

According to a second aspect, an embodiment of the disclosure relates to a method for encoding of a video bitstream implemented by an encoding device, wherein the video bitstream includes data representing a current picture, the encoding method comprising: determining whether an adaptive loop filter (ALF) is enabled for the current picture; encoding a picture-level syntax element into a picture header of the current picture based on the determining whether an adaptive loop filter (ALF) is enabled for the current picture, wherein the picture-level syntax element is used to specify whether an adaptive loop filter (ALF) is enabled for the current picture; in case that an adaptive loop filter is enabled for the current picture, encoding an parameter set identifier into the picture header, wherein the parameter set identifier is used to indicate a first parameter set comprising a set of ALF parameters of an adaptive loop filter, and wherein a temporal identifier of the first parameter set is set to be less than or equal to a temporal identifier of the current picture.

In an embodiment, determining whether an adaptive loop filter (ALF) is enabled for the current picture may comprises: compare the cost of performing an adaptive loop filter (ALF) on at least one block of the current picture with the cost of without performing an adaptive loop filter (ALF) on the current picture, in case that the cost of performing an adaptive loop filter (ALF) on at least one block of the current picture is larger than or equal to the cost of performing an adaptive loop filter (ALF) on at least one block of the current picture, determining that an adaptive loop filter (ALF) is disabled for the current picture; otherwise, determining that an adaptive loop filter (ALF) is enabled for the current picture. The cost may be rate-distortion cost.

In an embodiment, the method further comprises: encoding the temporal identifier of the first parameter set and the temporal identifier of the current picture into the video bitstream.

In an embodiment, the first parameter set comprises a set of ALF parameters of an adaptive loop filter performed on the luma component of at least one slice of the current picture.

In an embodiment, the method further comprises: in case that the picture-level syntax element specifies the adaptive loop filter is enabled for the current picture, encoding another parameter set identifier into the picture header, wherein the parameter set identifier is used to indicate a second parameter set comprising a set of ALF parameters of an adaptive loop filter performed on the chroma component of at least one slice of the current picture, and wherein a temporal identifier of the second parameter set is set to be less than or equal to a temporal identifier of the current picture.

According to a third aspect, an embodiment of the disclosure relates to an apparatus for decoding a coded video bitstream. The apparatus comprises: an obtaining unit configured to obtain a picture-level syntax element included in a picture header of the current picture by parsing the video bitstream, wherein the picture-level syntax element is used to specify whether an adaptive loop filter (ALF) is enabled for the current picture. The obtaining unit is further configured to obtain, in case that the picture-level syntax element specifies the adaptive loop filter is enabled for the current picture, a parameter set identifier included in the picture header, wherein the parameter set identifier is used to indicate a first parameter set comprising a set of ALF parameters, and wherein a temporal identifier of the first parameter set is less than or equal to a temporal identifier of the current picture; and a filtering unit configured to perform the adaptive loop filter on at least one slice of the current picture based on the first parameter set.

In an embodiment, the filtering unit is configured to perform an adaptive loop filter on the luma component of at least one slice of the current picture based on the first parameter set.

In an embodiment, the obtaining unit is further configured to obtain, in case that the picture-level syntax element specifies the adaptive loop filter is enabled for the current picture, another parameter set identifier included in the picture header, wherein the parameter set identifier is used to indicate a second parameter set comprising a set of ALF parameters, and wherein a temporal identifier of the second parameter set is less than or equal to a temporal identifier of the current picture; the filtering unit is configured to perform an adaptive loop filter on the chroma component of at least one slice of the current picture based on the second parameter set.

According to a fourth aspect, an embodiment of the disclosure relates to an apparatus for encoding a coded video bitstream. The apparatus comprises: a determining unit configured to determine whether an adaptive loop filter (ALF) is enabled for the current picture; an encoding unit configured to encode a picture-level syntax element into a picture header of the current picture based on the determining whether an adaptive loop filter (ALF) is enabled for the current picture, wherein the picture-level syntax element is used to specify whether an adaptive loop filter (ALF) is enabled for the current picture; the encoding unit is further configured to encode, in case that an adaptive loop filter is enabled for the current picture, a parameter set identifier into the picture header, wherein the parameter set identifier is used to indicate a first parameter set comprising a set of ALF parameters of an adaptive loop filter, and wherein a temporal identifier of the first parameter set is set to be less than or equal to a temporal identifier of the current picture.

In an embodiment, the encoding unit is further configured to encode the temporal identifier of the first parameter set and the temporal identifier of the current picture into the video bitstream.

In an embodiment, the first parameter set comprises a set of ALF parameters of an adaptive loop filter performed on the luma component of at least one slice of the current picture.

In an embodiment, the encoding unit is further configured to encode, in case that the picture-level syntax element specifies the adaptive loop filter is enabled for the current picture, another parameter set identifier into the picture header, wherein the parameter set identifier is used to indicate a second parameter set comprising a set of ALF parameters of an adaptive loop filter performed on the chroma component of at least one slice of the current picture, and wherein a temporal identifier of the second parameter set is set to be less than or equal to a temporal identifier of the current picture.

The method embodiments according to the first aspect of the disclosure can be performed by the apparatus according to the third aspect of the disclosure. Further features and embodiments of the method according to the first aspect of the disclosure correspond to the features and embodiments of the apparatus according to the third aspect of the disclosure.

The method according to the second aspect of the disclosure can be performed by the apparatus according to the fourth aspect of the disclosure. Further features and embodiments of the method according to the second aspect of the disclosure correspond to the features and embodiments of the apparatus according to the fourth aspect of the disclosure.

The method according to the second aspect can be extended into embodiments corresponding to the embodiments of the method according to the first aspect. Hence, an embodiment of the method according to the second aspect comprises the feature(s) of the corresponding embodiment of the first aspect.

The advantages of the methods according to the second aspect are the same as those for the corresponding embodiments of the method according to the first aspect.

According to a fifth aspect, an embodiment of the disclosure relates to an apparatus for decoding a video stream includes a processor and a memory. The memory is storing instructions that cause the processor to perform the method according to the first aspect or any implementation of the first aspect.

According to a sixth aspect, an embodiment of the disclosure relates to an apparatus for encoding a video stream includes a processor and a memory. The memory is storing instructions that cause the processor to perform the method according to the second aspect or any implementation of the second aspect.

According to a seventh aspect, a computer-readable storage medium having stored thereon instructions that when executed cause one or more processors configured to code video data is proposed. The instructions cause the one or more processors to perform a method according to the first or second aspect or any implementation of the first or second aspect.

According to an eighth aspect, an embodiment of the disclosure relates to a computer program comprising program code for performing the method according to the first or second aspect or any implementation of the first or second aspect when executed on a computer.

According to a ninth aspect, an embodiment of the disclosure relates to a decoder comprising processing circuitry for carrying out the method according to the first aspect or any implementation of the first aspect.

According to a tenth aspect, an embodiment of the disclosure relates to an encoder comprising processing circuitry for carrying out the method according to the second aspect or any implementation of the second aspect.

According to an eleventh aspect, an embodiment of the disclosure relates to a non-transitory storage medium which includes an encoded bitstream decoded by an image decoding device, the bitstream being generated by dividing a current picture of a video signal or an image signal into a plurality blocks, and comprising a plurality of syntax elements, wherein the plurality of syntax elements comprises a picture-level syntax element included in a picture header of the current picture by parsing the video bitstream, wherein the picture-level syntax element is used to specify whether an adaptive loop filter (ALF) is enabled for the current picture; in case that the picture-level syntax element specifies the adaptive loop filter is enabled for the current picture, the bitstream further comprises an parameter set identifier included in the picture header, wherein the parameter set identifier is used to indicate a first parameter set comprising a set of ALF parameters, and wherein a temporal identifier of the first parameter set is set to be less than or equal to a temporal identifier of the current picture.

Particular embodiments are outlined in the attached independent claims, with other embodiments in the dependent claims.

Details of one or more embodiments are set forth in the accompanying drawings and the description below. Other features, objects, and advantages will be apparent from the description, drawings, and claims.

Furthermore, the following embodiments are provided.

In one embodiment, a bitstream for video coding is provided, wherein DPS exists in the bitstream at most once.

In one embodiment, wherein DPS is not mandatory in the bitstream.

In one embodiment, wherein when the bitstream contains DPS, only one DPS is in the bitstream.

In one embodiment, wherein all DPS NAL units with a particular value of dps_decoding_parameter_set_id in a bitstream shall have the same content.

In one embodiment, wherein one DPS id cannot hook more than one DPS content.

In one embodiment, a bitstream for video coding is provided, wherein a level signaled in DPS is constrained to be no less than the level signaled in SPS.

In one embodiment, a method of coding implemented by a decoding device is provided, which comprises parsing the bitstream according to any one of the preceding embodiments.

In one embodiment, a method of coding implemented by an encoding device is provided, comprising producing the bitstream according to any one of the preceding embodiments.

In one embodiment, an encoder (20) comprising processing circuitry for carrying out the method according to any one of the preceding embodiments is provided.

In one embodiment, a decoder (30) comprising processing circuitry for carrying out the method according to any one of the preceding embodiments is provided.

In one embodiment, a computer program product comprising program code for performing the method according to any one of the preceding embodiments when executed on a computer or a processor is provided.

In one embodiment, a decoder is provided, comprising:
one or more processors; and
a non-transitory computer-readable storage medium coupled to the processors and storing programming for execution by the processors, wherein the programming, when executed by the processors, configures the decoder to carry out the method according to any one of the preceding embodiments.

In one embodiment, an encoder is provided, comprising:
one or more processors; and
a non-transitory computer-readable storage medium coupled to the processors and storing programming for execution by the processors, wherein the programming, when executed by the processors, configures the encoder to carry out the method according to any one of the preceding embodiments.

In one embodiment, a non-transitory computer-readable medium carrying a program code which, when executed by a computer device, causes the computer device to perform the method according to any one of the preceding embodiments is provided.

In one embodiment, a method for decoding of a video bitstream implemented by a decoding device is provided, wherein the video bitstream includes data representing a coded picture comprising tile columns, the decoding method comprising:
obtaining syntax elements (for example, tile_column_width minus1) by parsing the video bitstream, wherein the syntax element is used to derive the widths of the tile columns, wherein the sum of the widths of the tile columns is less than or equal to the width of the coded picture;
predicting the coded picture according to the widths of the tile columns.

In one embodiment, wherein the value of each syntax element of the syntax element plus 1 is a width of a tile column of the tile columns.

In one embodiment, wherein the widths of the tile columns are with index i in range of 0 to num_exp_tile_columns_minus1−1.

In one embodiment, wherein the widths of the tile columns are with index i in range of 0 to num_exp_tile_columns_minus1.

In one embodiment, a method for decoding of a video bitstream implemented by a decoding device is provided, wherein the video bitstream includes data representing a coded picture comprising tile columns, the decoding method comprising:

obtaining a syntax element (for example, tile_column_width_minus1) by parsing the video bitstream, wherein the syntax element is used to derive the value of widths of the tile columns, wherein the value of widths of the tile columns are uniform, and the value of widths of the tile columns is less than or equal to the width of the coded picture;

predicting the coded picture according to the widths of the tile columns.

In one embodiment, wherein the value of the syntax element plus 1 is the value of widths of the tile columns.

In one embodiment, wherein the widths of the tile columns are with index i equal to num_exp_tile_columns_minus1.

In one embodiment, a method for decoding of a video bitstream implemented by a decoding device is provided, wherein the video bitstream includes data representing a coded picture comprising tile rows, the decoding method comprising:

obtaining syntax elements (for example, tile_row_height_minus1) by parsing the video bitstream, wherein the syntax element is used to derive the heights of the tile rows, wherein the sum of the heights of the tile rows is less than or equal to the height of the coded picture;

predicting the coded picture according to the heights of the tile rows.

In one embodiment, wherein the value of each syntax element of the syntax element plus 1 is a height of a tile row of the tile rows.

In one embodiment, wherein the heights of the tile rows are with index i in range of 0 to num_exp_tile_rows_minus1−1.

In one embodiment, wherein the heights of the tile rows are with index i in range of 0 to num_exp_tilerows_minus1.

In one embodiment, a method for decoding of a video bitstream implemented by a decoding device is provided, wherein the video bitstream includes data representing a coded picture comprising tile rows, the decoding method comprising:

obtaining a syntax element, for example, tile_row_height_minus1) by parsing the video bitstream, wherein the syntax element is used to derive the value of heights of the tile rows, wherein the value of heights of the tile rows are uniform, and the value of heights of the tile rows is less than or equal to the height of the coded picture;

predicting the coded picture according to the heights of the tile rows.

In one embodiment, wherein the value of the syntax element plus 1 is the value of heights of the tile rows.

In one embodiment, wherein the heights of the tile rows are with index i equal to num_exp_tile_rows_minus1.

In one embodiment, an encoder (20) comprising processing circuitry for carrying out the method according to any one of the preceding embodiments is provided.

In one embodiment, a decoder (30) comprising processing circuitry for carrying out the method according to any one of the preceding embodiments is provided.

In one embodiment, a computer program product comprising program code for performing the method according to any one of the preceding embodiments when executed on a computer or a processor is provided.

In one embodiment, a decoder is provided, comprising:
one or more processors; and
a non-transitory computer-readable storage medium coupled to the processors and storing programming for execution by the processors, wherein the programming, when executed by the processors, configures the decoder to carry out the method according to any one of the preceding embodiments.

In one embodiment, an encoder is provided, comprising:
one or more processors; and
a non-transitory computer-readable storage medium coupled to the processors and storing programming for execution by the processors, wherein the programming, when executed by the processors, configures the encoder to carry out the method according to any one of the preceding embodiments.

In one embodiment, a non-transitory computer-readable medium carrying a program code which, when executed by a computer device, causes the computer device to perform the method according to any one of the preceding embodiments is provided.

BRIEF DESCRIPTION OF THE DRAWINGS

In the following embodiments of the disclosure are described in more detail with reference to the attached figures and drawings, in which.

Figure 1A:
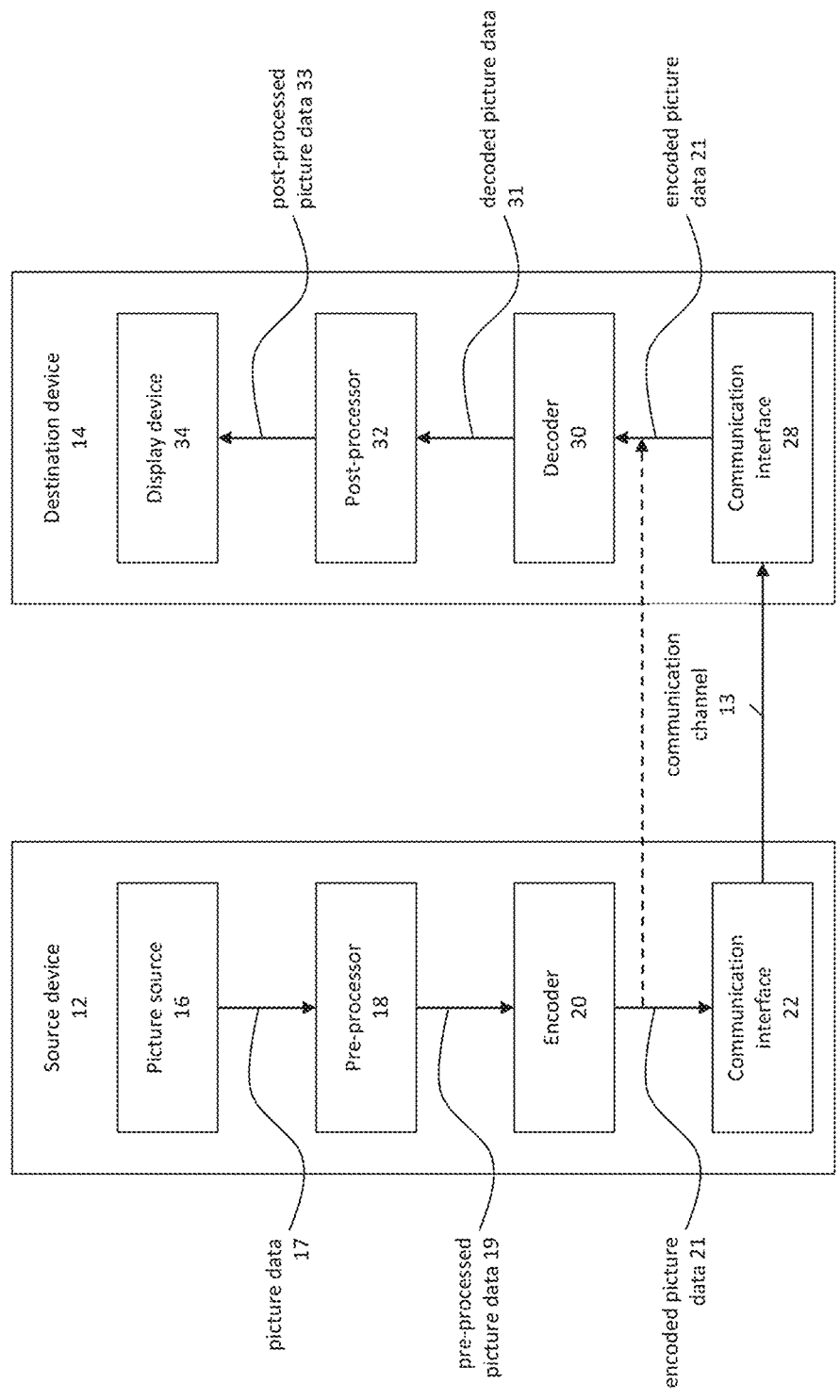
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example, a camera for capturing a real-world picture, and/or any kind of a picture generating device, for example, a computer-graphics processor for generating a computer animated picture, or any kind of other devices for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32), and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
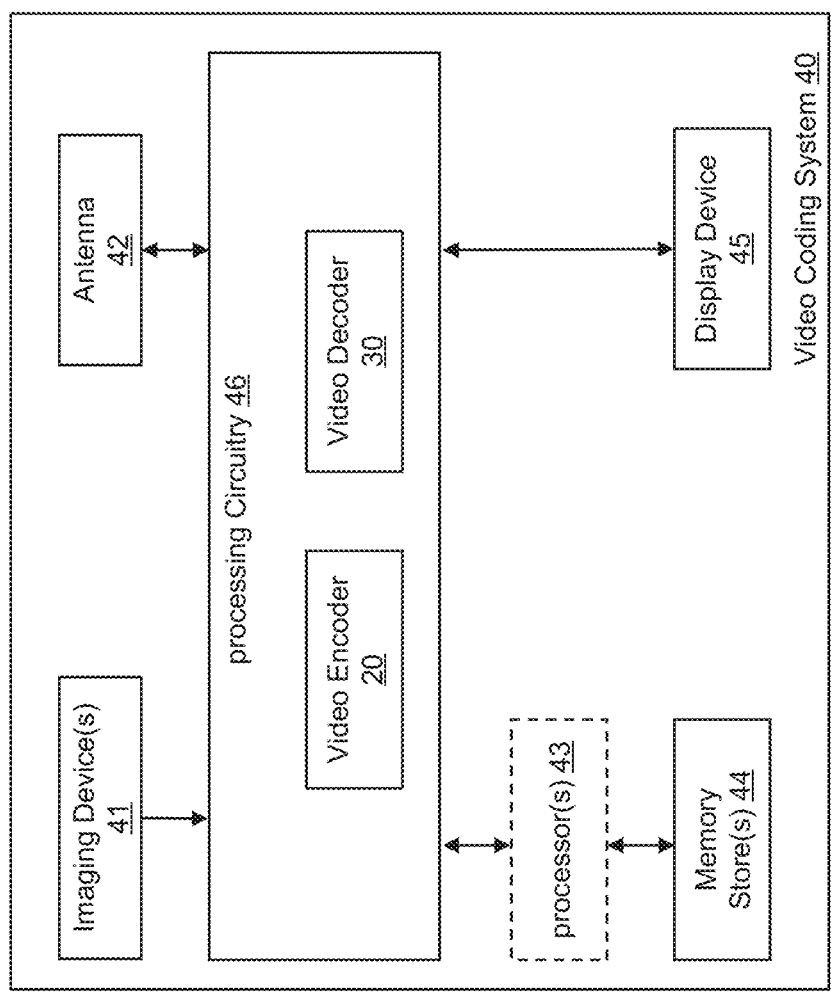
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding are performed by devices that do not communicate with one another, but simply encode data to memory and/or retrieve and decode data from memory.

For the convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
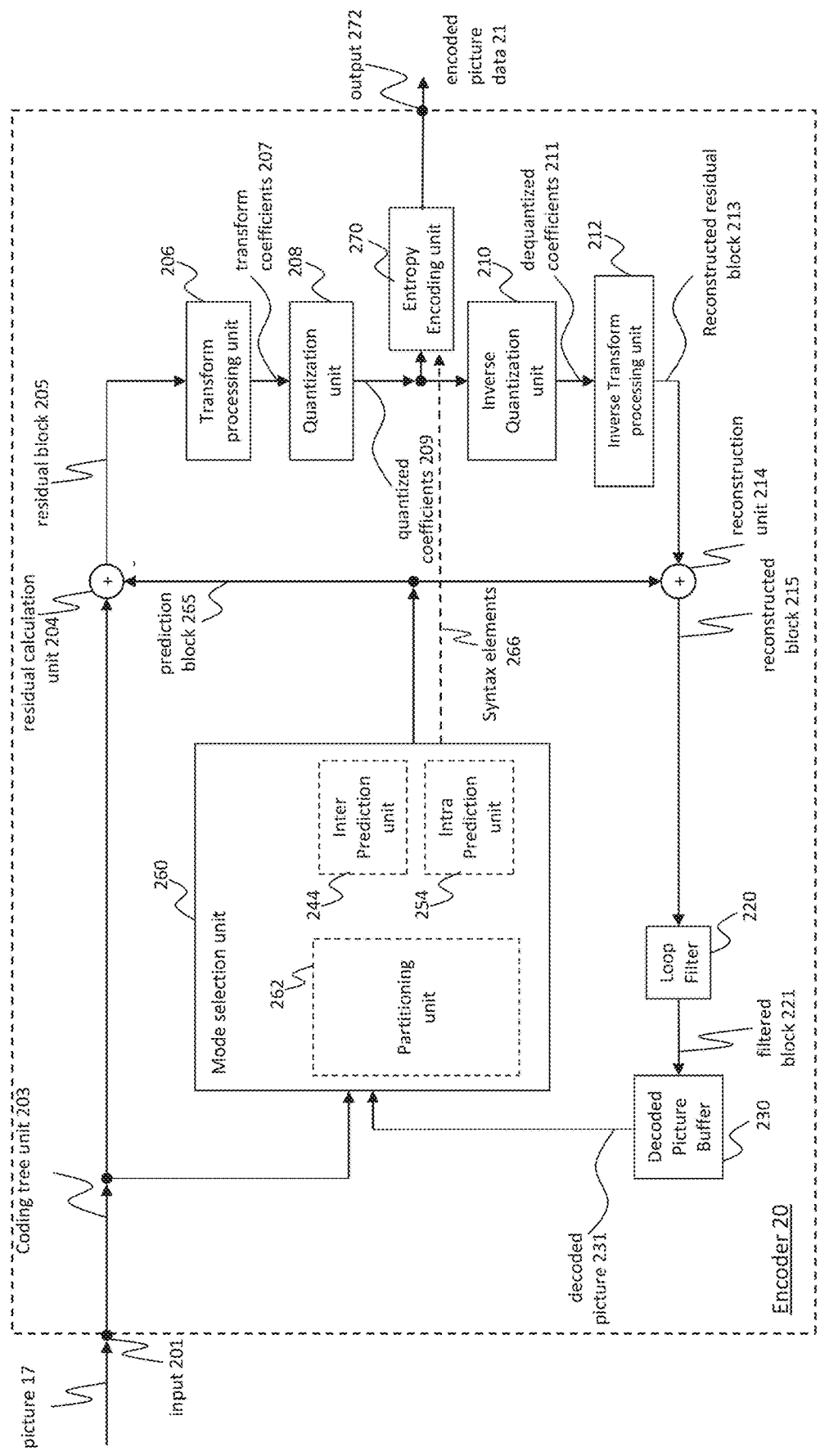
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
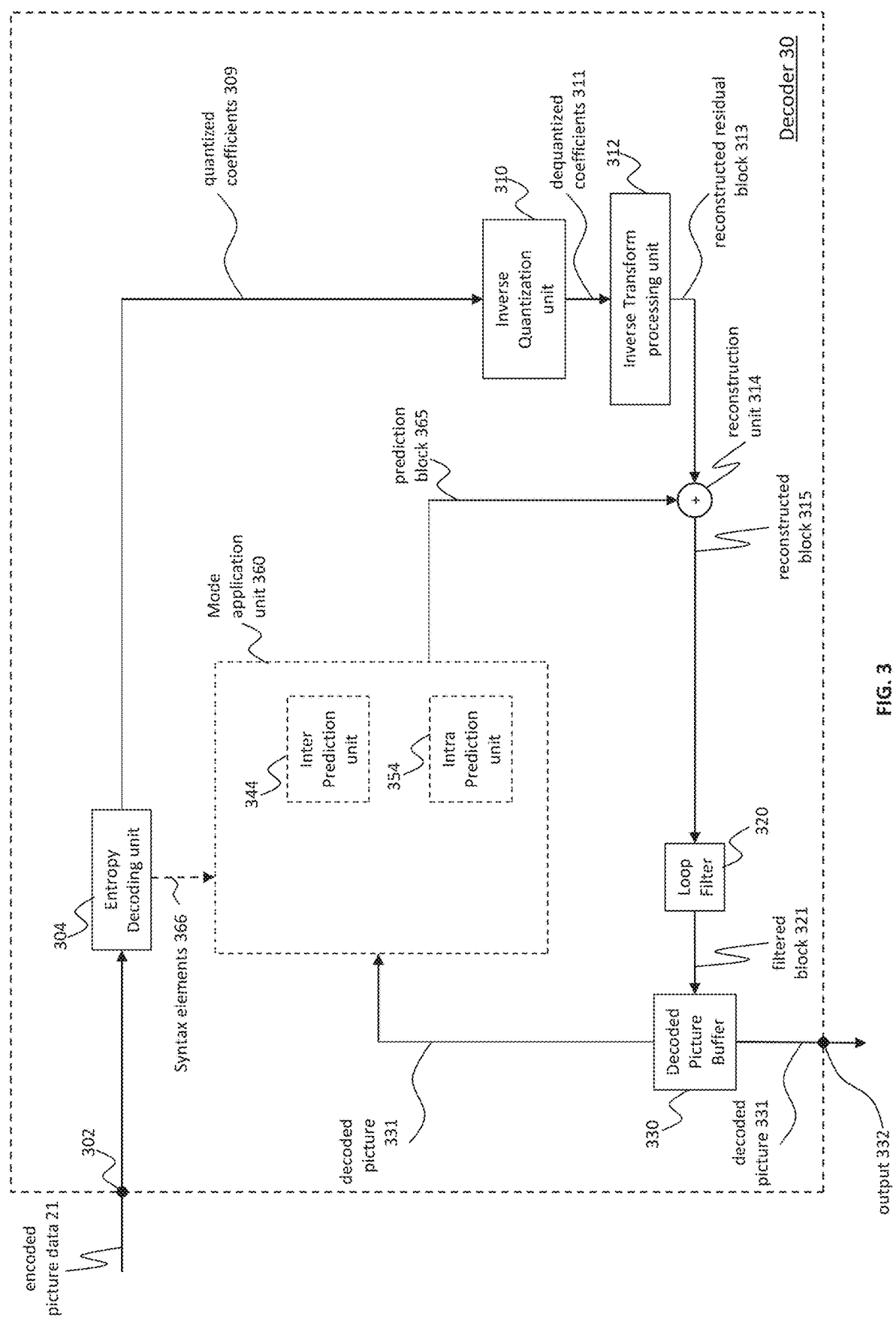
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as a pixel (short form of picture element) or a pel. The number of samples in the horizontal and vertical direction (or axis) of the array or picture defines the size and/or resolution of the picture. For representation of color, typically three color components are employed, i.e. the picture may be represented or include three sample arrays. In RBG format or color space a picture comprises a corresponding red, green and blue sample array. However, in video coding, each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters (ALF parameters) or LMCS parameters), e.g. directly or encoded via the entropy encoding unit 270, so that, e.g., a decoder 30 may receive and apply the same loop filter parameters or respective loop filters for decoding. Wherein the entropy encoding unit 270 may also encode a picture-level syntax element into a picture header of the current picture, wherein the picture-level syntax element is used to specify whether an adaptive loop filter (ALF) is enabled for the current picture Decoded Picture Buffer The decoded picture buffer (DPB) 230 may be a memory that stores reference pictures, or in general reference picture data, for encoding video data by video encoder 20.

The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary-tree-partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

Figure 6:
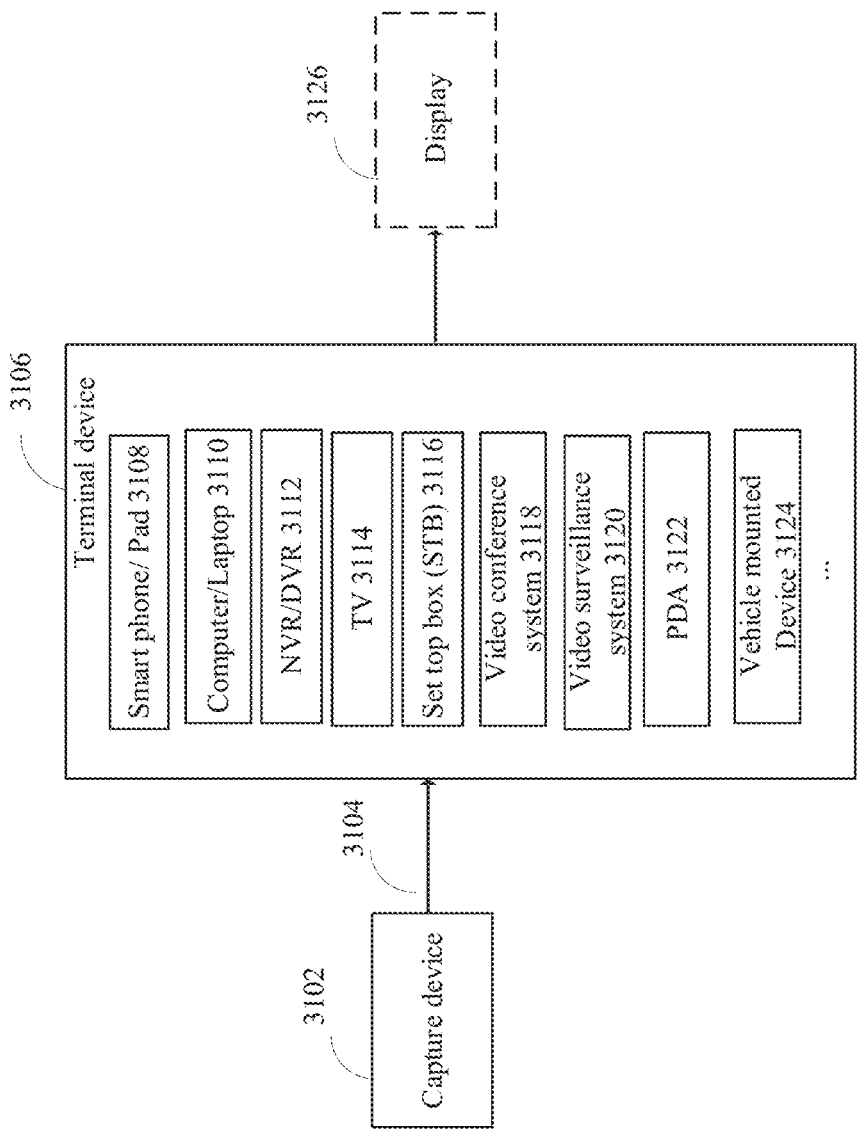
FIG. 6 is a block diagram showing an example structure of a content supply system 3100 which realizes a content delivery service.

In embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma block pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units s(VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size. In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters (such as a set of ALF parameters) and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP)

edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
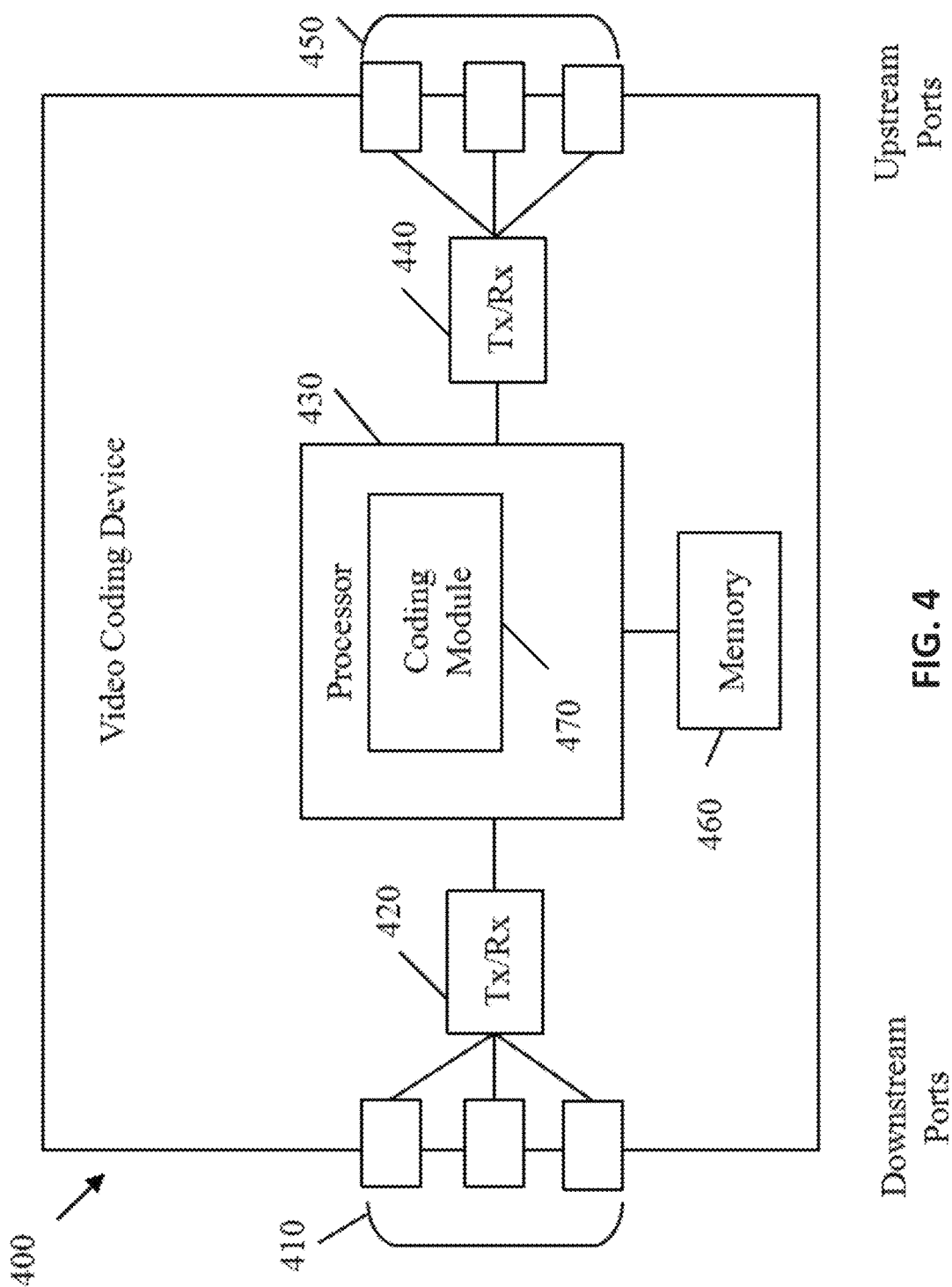
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
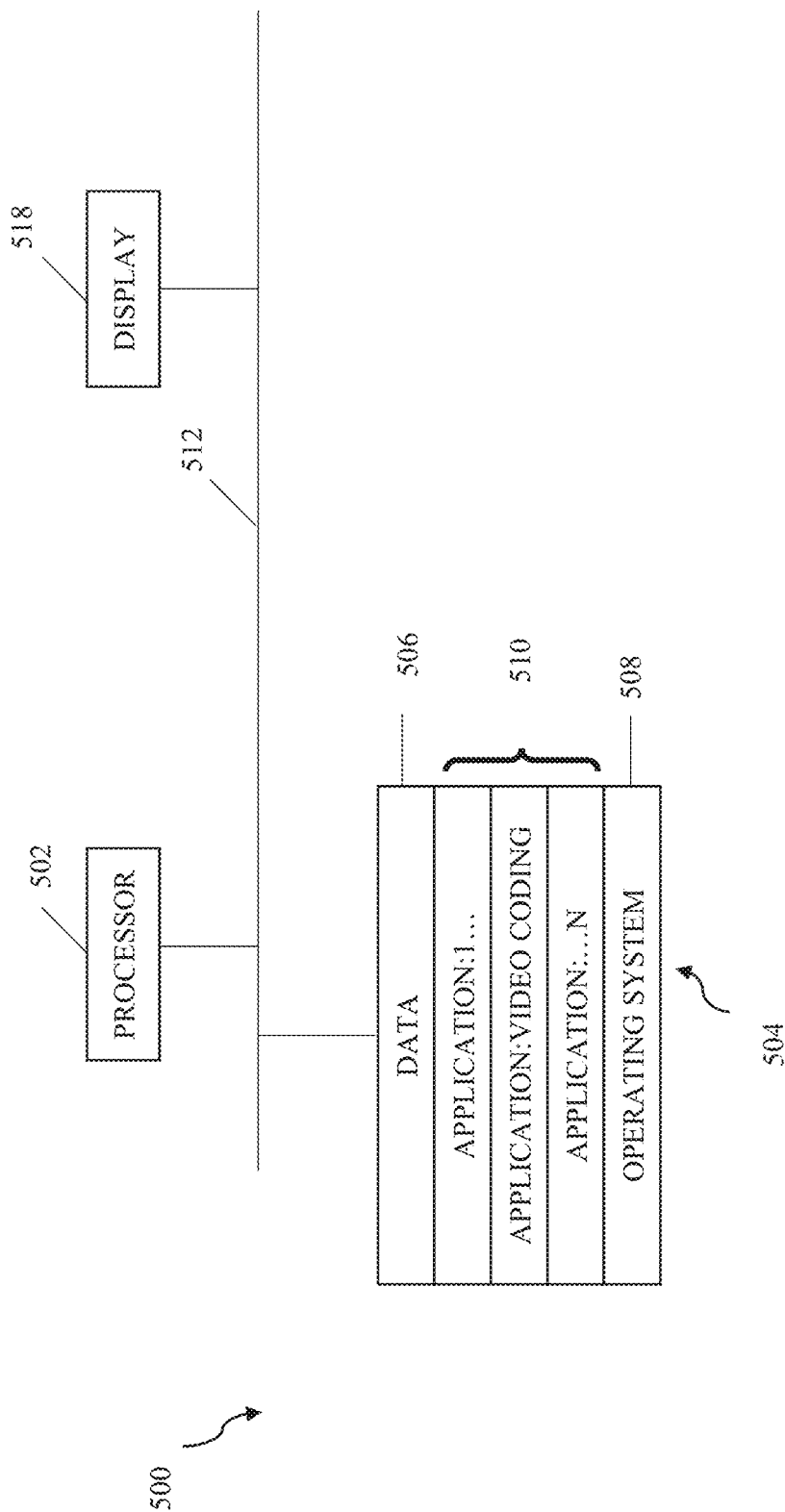
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read-only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Decoder Parameter Set (DPS)

the syntax structure is proposed to contain the maximum number of sub-layers (as in HEVC) and a profile_level( ) syntax structure, which indicates a profile and a level of a decoder that is capable of decoding the bitstream and includes the constraints that apply to the bitstream.

An example of the syntax table of DPS is shown below:

|  | Descriptor |
| --- | --- |
| decoding_parameter_set_rbsp( ) { |  |
|   dps_decoding_parameter_set_id | u(4) |
|   dps_max_sublayers_minus1 | u(3) |
|   dps_reserved_zero_5bits | u(5) |
|   dps_num_ptls_minus1 | u(4) |
|   for( i = 0; i <= dps_num_ptls_minus 1; i++ ) |  |
|     profile_tier_level( 1, dps max sublayers minus1 ) |  |
|   dps_extension_flag | u(1) |
|   if( dps_extension_flag ) |  |
|     while( more_rbsp_data( )) |  |
|       dps_extension_data_flag | u(1) |
|   rbsp_trailing_bits( ) |  |
| } |  |

A DPS raw byte sequence payload (RBSP) shall be available to the decoding process prior to it being referenced, included in at least one AU with temporal identifier (TemporalId) equal to 0 or provided through external means.

NOTE 1—DPS NAL units are required to be available (either in the bitstream or by external means) to the decoding process prior to their being referenced. However, the DPS RBSP contains information that is not necessary for operation of the decoding process specified in clauses 2 through 9 of this Specification.

dps_decoding_parameter_set_id identifies the DPS for reference by other syntax elements. The value of dps_decoding_parameter_set_id shall be greater than 0.

dps_max_sublayers_minus1 plus 1 specifies the maximum number of temporal sublayers that may be present in a layer in each CVS referring to the DPS. The value of dps_max_sublayers_minus1 shall be in the range of 0 to 6, inclusive.

dps_reserved_zero_5bits shall be equal to 0 in bitstreams conforming to this version of this Specification. Other values for dps_reserved_zero_5bits are reserved for future use by ITU-T|ISO/IEC.

dps_num_ptls_minus1 plus 1 specifies the number of profile tier level( ) syntax structures in the DPS.

When there is more than one profile_tier_level( ) syntax structure in a DPS, it is a requirement of bitstream conformance that each CVS in the bitstream conforms to at least one of the profile tier level( ) syntax structures.

dps_extension_flag equal to 0 specifies that no dps_extension_data_flag syntax elements are present in the DPS RBSP syntax structure. dps_extension_flag equal to 1 specifies that there are dps_extension_data_flag syntax elements present in the DPS RBSP syntax structure.

dps_extension_data_flag may have any value. Its presence and value do not affect decoder conformance to profiles specified in Annex A. Decoders conforming to this version of this Specification shall ignore all dps_extension_data_flag syntax elements.

Sequence Parameter Set RBSP Syntax:

| | Descriptor |
|---|---|
| seq_parameter_set_rbsp( ) { | |
| ... | |
|   sps_ptl_dpb_hrd_params_present_flag | u(1) |
|   if( sps_ptl_dpb_hrd_params_present_flag ) | |
|     profile_tier_level( 1, sps max sublayers minus1 ) | |
| ... | | sps_ptl_dpb_hrd_params_present_flag equal to 1 specifies that a profile tier level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb hrd_params_present_flag equal to 0 specifies that none of these four syntax structures is present in the SPS. The value of sps_ptl_dpb_hrd_params_present_flag shall be equal to vps_independent_layer_flag[GeneralLayerIdx[nuh_layer_id]].

If vps_independent_layer_flag[GeneralLayerIdx[nuh layer_id]] is equal to 1, the variable MaxDecPicBuffMinus1 is set equal to max_dec pic_buffering_minus1[sps_max_sublayers_minus1] in the dpb_parameters( ) syntax structure in the SPS. Otherwise, MaxDecPicBuffMinus1 is set equal to max_dec pic_buffering_minus1[sps_max_sublayers_minus1] in the layer nonoutput_dpb_params_idx[GeneralLayerIdx[nuh_layer_id]]-th dpb_parameters( ) syntax structure in the VPS.

General Profile, Tier, and Level Syntax:

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus1; i++ ) | |
|     sublayer_level_present_flag[ i ] | u(1) |
|   while( !byte_aligned( )) | |
|     ptl_alignment_zero_bit | f(1) |
|   for( i = 0; i < maxNumSubLayersMinus1; i++ ) | |
|     if( sublayer_level_present_flag[ i ] ) | |
|       sublayer_level_idc[ i ] | u(8) |
| } | |

General Profile, Tier, and Level Semantics:

A profile tier level( ) syntax structure provides level information and, optionally, profile, tier, sub-profile, and general constraints information.

When the profile_tier_level( ) syntax structure is included in a DPS, the OlsInScope is OLS that includes all layers in the entire bitstream that refers to the DPS. When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.

general_profile_idc indicates a profile to which OlsInScope conforms as specified in Annex A. Bitstreams shall not contain values of general_profile_idc other than those specified in Annex A. Other values of general_profile_idc are reserved for future use by ITU-T|ISO/IEC.

general_tier_flag specifies the tier context for the interpretation of general_level_idc as specified in Annex A.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE1—A greater value of general_level_idc indicates a higher level. The maximum level signalled in the DPS for OlsInScope may be higher than the level signalled in the SPS for a CVS contained within OlsInScope.

NOTE2—When OlsInScope conforms to multiple profiles, general_profile_idc should indicate the profile that provides the preferred decoded result or the preferred bitstream identification, as determined by the encoder (in a manner not specified in this Specification).

NOTE3—When the profile_tier_level( ) syntax structure is included in a DPS and CVSs of OlsInScope conform to different profiles, general_profile_idc and level_idc should indicate the profile and level for a decoder that is capable of decoding OlsInScope.

num_sub_profiles specifies the number of the general_sub_profile_idc[i] syntax elements.

general_sub_profile_idc[i] indicates the i-th interoperability metadata registered as specified by Rec. ITU-T T.35, the contents of which are not specified in this Specification.

sublayer_level_present_flag[i] equal to 1 specifies that level information is present in the profile tier level( ) syntax structure for the sublayer representation with TemporalId equal to i. sublayer_level_present_flag[i] equal to 0 specifies that level information is not present in the profile tier level( ) syntax structure for the sublayer representation with TemporalId equal to i.

ptl_alignment_zero_bits shall be equal to 0.

The semantics of the syntax element sublayer_level_idc[i] is, apart from the specification of the inference of non-present values, the same as the syntax element general_level_idc, but apply to the sublayer representation with TemporalId equal to i.

When not present, the value of sublayer_level_idc[i] is inferred as follows:

sublayer_level_idec[maxNumSubLayersMinus1] is inferred to be equal to general_level_idc of the same profile tier level( ) structure, For i from maxNumSubLayersMinus1−1 to 0 (in decreasing order of values of i), inclusive, sublayer_level_idc[i] is inferred to be equal to sublayer_level_idc[i+1].

Picture Header RBSP Syntax:

| | Descriptor |
|---|---|
| picture_header_rbsp( ) { | |
| ... | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc) | |
|         pic_alf_aps_id_chroma | u(3) |
|     } | |
|   } | |
| } | |
| ... | | pic_alf_enabled_present_flag equal to 1 specifies that pic_alf_enabled_flag, pic_num_alf_aps_ids_luma, pic_alf_aps_id_luma[i], pic_alf_chroma_idc, and pic_alf_aps_id_chroma are present in the PH. pic_alf_enabled_present_flag equal to 0 specifies that pic_alf_enabled_flag, pic_num_alf_aps_ids_luma, pic_alf_aps_id_luma[i], pic_alf_chroma_idc, and pic_alf_aps_id_chroma are not present in the PH. When pic_alf_enabled_present_flag is not present, it is inferred to be equal to 0.

pic_alf_enabled_flag equal to 1 specifies that adaptive loop filter is enabled for all slices associated with the PH and may be applied to Y, Cb, or Cr colour component in the slices. pic_alf_enabled_flag equal to 0 specifies that adaptive loop filter may be disabled for one, or more, or all slices associated with the PH. When not present, pic_alf_enabled_flag is inferred to be equal to 0.

pic_num_alf_aps_ids_luma specifies the number of ALF APSs that the slices associated with the PH refer to.

pic_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to pic_alf_aps_id_luma[i] shall be equal to 1.

pic_alf_chroma_idc equal to 0 specifies that the adaptive loop filter is not applied to Cb and Cr colour components. pic_alf_chroma_ide equal to 1 indicates that the adaptive loop filter is applied to the Cb colour component. pic_alf_chroma_ide equal to 2 indicates that the adaptive loop filter is applied to the Cr colour component. pic_alf_chroma_idc equal to 3 indicates that the adaptive loop filter is applied to Cb and Cr colour components. When pic_alf_chroma_idc is not present, it is inferred to be equal to 0.

pic_alf_aps_id_chroma specifies the adaptation_parameter_set_id of the ALF APS that the chroma component of the slices associated with the PH refers to.

The value of alf_chroma_filter_signal flag of the APS NAL unit having aps_params_type equal to ALF_APS and adaptation parameter_set_id equal to pic_alf_aps_id_chroma shall be equal to 1.

PPS

| | Descriptor |
|---|---|
| pic_parameter_set_rbsp( ) { | |
| ... | |
|   pps_subpic_id_signalling_present_flag | u(1) |
|   if( pps_subpic_id_signalling_present_flag ) { | |
|     pps_num_subpics_minus1 | ue(v) |
|     pps_subpic_id_len_minus1 | ue(v) |
|     for( i = 0;i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && ! single_slice_per_subpic_flag ) { | |
|       num_slices_in_picminus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |

|  | Descriptor |
|---|---|
|       num_slices_in_tile_minus1[ i ] | ue(v) |
|       for( j = 0; j < num_slices_in_tile_minus1[ i ]; j++ ) |  |
|         slice_height_in_ctu_minus1[ i++ ] | ue(v) |
|     } |  |
|     if( tile_idx_delta_present_flag && i < num_slices_in_pic_minus1 ) |  |
|       tile_idx_delta[ i ] | se(v) |
|   } |  |
| } |  |
| ... |  | pps_subpic_id_signalling_present_flag equal to 1 specifies that subpicture ID mapping is signalled in the PPS. pps_subpic_id_signalling_present_flag equal to 0 specifies that subpicture ID mapping is not signalled in the PPS. When sps_subpic_id_present_flag is 0 or sps_subpic_id_signalling_present_flag is equal to 1, pps_subpic_id_signalling_present_flag shall be equal to 0.

pps_num_subpics_minus1 plus 1 specifies the number of subpictures in the coded pictures referring to the PPS.

It is a requirement of bitstream conformance that the value of pps_num_subpic_minus1 shall be equal to sps_num_subpics_minus1.

pps_subpic_id_len_minus1 plus 1 specifies the number of bits used to represent the syntax element pps_subpic_id[i]. The value of pps_subpic_id_len_minus1 shall be in the range of 0 to 15, inclusive.

It is a requirement of bitstream conformance that the value of pps_subpic_id_len_minus1 shall be the same for all PPSs that are referred to by coded pictures in a CLVS.

pps_subpic_id[i] specifies the subpicture ID of the i-th subpicture. The length of the pps_subpic_id[i] syntax element is pps_subpic_id_len_minus1+1 bits.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpics_present_flag is equal to 1, the value of rect_slice flag shall be equal to 1.

single_slice_per_subpic_flag equal to 1 specifies that each subpicture consists of one and only one rectangular slice. single_slice_per_subpic_flag equal to 0 specifies that each subpicture may consist one or more rectangular slices. When subpics_present_flag is equal to 0, single_slice_per_subpic_flag shall be equal to 0. When single_slice_per_subpic_flag is equal to 1, num_slices_in_pic_minus1 is inferred to be equal to sps_num_subpics_minus1.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta present_flag equal to 0 specifies that tile_idx_delta values are not present in the PPS and that all rectangular slices in pictures referring to the PPS are specified in raster order according to the process defined in clause 6.5.1. tile_idx_delta_present flag equal to 1 specifies that tile_idx_delta values may be present in the PPS and that all rectangular slices in pictures referring to the PPS are specified in the order indicated by the values of tile_idx_delta.

slice_width_in_tiles_minus1[i] plus 1 specifies the width of the i-th rectangular slice in units of tile columns. The value of slice_width in_tiles_minus1[i] shall be in the range of 0 to NumTileColumns−1, inclusive. When not present, the value of slice_width_in_tiles_minus1[i] is inferred as specified in clause 6.5.1.

slice_height_in_tiles_minus1[i] plus 1 specifies the height of the i-th rectangular slice in units of tile rows. The value of slice height_in_tiles minus1[i] shall be in the range of 0 to NumTileRows−1, inclusive. When not present, the value of slice height_in_tiles_minus1[i] is inferred as specified in clause 6.5.1.

num_slices_in_tile_minus1[i] plus 1 specifies the number of slices in the current tile for the case where the i-th slice contains a subset of CTU rows from a single tile. The value of num_slices_in_tile_minus1[i] shall be in the range of 0 to RowHeight[tileY]−1, inclusive, where tileY is the tile row index containing the i-th slice. When not present, the value of num_slices_in_tile minus1[i] is inferred to be equal to 0.

slice_height_in_ctu_minus1[i] plus 1 specifies the height of the i-th rectangular slice in units of CTU rows for the case where the i-th slice contains a subset of CTU rows from a single tile. The value of slice height_in_ctu_minus1[i] shall be in the range of 0 to RowHeight[tileY]−1, inclusive, where tileY is the tile row index containing the i-th slice.

tile_idx_delta[i] specifies the difference in tile index between the i-th rectangular slice and the (i+1)-th rectangular slice. The value of tile idx_delta[i] shall be in the range of −NumTilesInPic+1 to NumTilesInPic−1, inclusive. When not present, the value of tile_idx_delta[i] is inferred to be equal to 0. In all other cases, the value of tile idx_delta[i] shall not be equal to 0.

6.5.1 CTB raster scanning, tile scanning, and subpicture scanning processes

The variable NumTileColumns, specifying the number of tile columns, and the list colWidth[i] for i ranging from 0 to NumTileColumn−1, inclusive, specifying the width of the i-th tile column in units of CTBs, are derived as follows:

```
remainingWidthInCtbsY = PicWidthInCtbsY
for( i = 0; i < num_exp_tile_columns_minus1; i++ ) {
    colWidth[ i ] = tile_column_width_minus1[ i ] + 1
    remainingWidthInCtbsY −= colWidth[ i ]
}
uniformTileColWidth =
tile_column_width_minus1[ num_exp_tile_columns_minus1 ] + 1      (23)
while( remainingWidthInCtbsY >= uniformTileColWidth ) {
    colWidth[ i++ ] = uniformTileColWidth
    remainingWidthInCtbsY −= uniformTileColWidth
}
if( remainingWidthInCtbsY > 0 )
    colWidth[ i++ ] = remainingWidthInCtbsY
NumTileColumns = i
```

The variable NumTileRows, specifying the number of tile rows, and the list RowHeight[j] for j ranging from 0 to NumTileRows−1, inclusive, specifying the height of the j-th tile row in units of CTBs, are derived as follows:

```
remainingHeightInCtbsY = PicHeightInCtbsY
for( j = 0; j < num_exp_tile_rows_minus1; j++ ) {
    RowHeight[ j ] = tile_row_height_minus1[ j ] + 1
    remainingHeightInCtbsY −= RowHeight[ j ]
}
uniformTileRowHeight = tile_row_height_minus1          (24)
[ num_exp_tile_rows_minus1 ] + 1
while( remainingHeightInCtbsY >= uniformTileRowHeight ) {
    RowHeight[ j++ ] = uniformTileRowHeight
    remainingHeightInCtbsY −= uniformTileRowHeight
}
if( remainingHeightInCtbsY > 0 )
    RowHeight[ j++ ] = remainingHeightInCtbsY
NumTileRows = j
```

The variable NumTilesinPic is set equal to NumTileColumns*NumTileRows.

The list tileColBd[i] for i ranging from 0 to NumTileColumns, inclusive, specifying the location of the i-th tile column boundary in units of CTBs, is derived as follows:

for(tileColBd[0]=0,i=0;i<NumTileColumns;i++)tile-
   ColBd[i+1]=tileColBd[i]+colWidth[i]                (25)

The list tileRowBd[j] for j ranging from 0 to NumTileRows, inclusive, specifying the location of the j-th tile row boundary in units of CTBs, is derived as follows:

for(tileRowBd[0]=0,j=0;j<NumTileRows;j++)tile-
   RowBd[j+1]=tileRowBd[j]+RowHeight[j]               (26)

The list CtbToTileColBd[ctbAddrX] for ctbAddrX ranging from 0 to PicWidthInCtbsY, inclusive, specifying the conversion from a horizontal CTB address to a left tile column boundary in units of CTBs, is derived as follows:

```
tileX = 0
for( ctbAddrX = 0; ctbAddrX <= picWidthInCtbsY; ctbAddrX++ ) {
    if( ctbAddrX == tileColBd[ tileX + 1 ] )
        (27)
        tileX++
    CtbToTileColBd[ ctbAddrX ] = tileColBd[ tileX ]
}
```

The list CtbToTileRowBd[ctbAddrY] for ctbAddrY ranging from 0 to PicHeightInCtbsY, inclusive, specifying the conversion from a vertical CTB address to a top tile column boundary in units of CTBs, is derived as follows:

```
tileY = 0
for( ctbAddrY = 0; ctbAddrY <= PicHeightInCtbsY; ctbAddrY++ ) {
    if( ctbAddrY == tileRowBd[ tileY + 1 ] )          (28)
        tileY++
    CtbToTileRowBd[ ctbAddrY ] = tileRowBd[ tileY ]
}
```

For rectangular slices, the list NumCtuInSlice[i] for i ranging from 0 to num_slices_in_pic_minus1, inclusive, specifying the number of CTU in the i-th slice, and the matrix CtbAddrInSlice[i][j] for i ranging from 0 to num_slices_in_pic_minus1, inclusive, and j ranging from 0 to NumCtuInSlice[i]−1, inclusive, specifying the picture raster scan address of the j-th CTB within the i-th slice, are derived as follows:

```
if( subpics_present_flag && single_slice_per_subpic_flag ) {
    for( i = 0; i <= sps_num_subpics_minus1; i++ )
        NumCtuInSlice[ i ] = 0
    for( i = 0; i < PicSizeInCtbsY; i ++ ) {
        sliceIdx = CtbToSubPicIdx[ i ]
        CtbAddrInSlice[ sliceIdx ][ NumCtuInSlice[ sliceIdx ] ] = i
        NumCtuInSlice[ sliceIdx ]++
    }
} else {
    tileIdx = 0
    for( i = 0; i <= num_slices_in_pic_minus1; i++ )
        NumCtuInSlice[ i ] = 0
    for( i = 0; i <= num_slices_in_pic_minus1; i++ ) {
        tileX = tileIdx % NumTileColumns
        tileY = tileIdx / NumTileColumns
        if( i == num_slices_in_pic_minus1 ) {
            slice_width_in_tiles_minus1[ i ] = NumTileColumn − 1 − tileX
            slice_height_in_tiles_minus1[ i ] = NumTileRows − 1 − tileY
            num_slices_in_tile_minus1[ i ] = 0
        }
        if( slice_width_in_tiles_minus1[ i ] == 0 &&
```

-continued

```
slice_height_in_tiles_minus1[ i ] == 0 ) {                              (29)
    ctbY = tileRowBd[ tileY ]
    for( j = 0; j < num_slices_in_tile_minus1[ i ]; j++ ) {
        AddCtbsToSlices( i, tileColBd[ tileX ], tileColBd[ tileX + 1 ],
            ctbY, ctbY + slice_height_in_ctu_minus1[ i ] + 1 )
        ctbY += slice_height_in_ctu_minus1[ i ] + 1
        i++
    }
    AddCtbsToSlice( i, tileColBd[ tileX ], tileColBd[ tileX + 1 ], ctbY,
tileRowBd[ tileY + 1 ] )
} else
    for( j = 0; j <= slice_height_in_tiles_minus1[ i ]; j++ )
        for( k = 0; k <= slice_width_in_tiles_minus1[ i ]; k++ )
            AddCtbsToSlice( i, tileColBd[ tileX + k ],
            tileColBd[ tileX + k + 1 ],
            tileRowBd[ tileY + j ], tileRowBd[ tileY + j + 1 ] )
    if( tile_idx_delta_present_flag )
        tileIdx += tile_idx_delta[ i ]
    else {
        tileIdx += slice_width_in_tiles_minus1[ i ] + 1
        if( tileIdx % NumTileColumns == 0)
            tileIdx += slice_height_in_tiles_minus1[ i ] * NumTileColumns
    }
    }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtuInSlice[ sliceIdx ] ] =
ctbY * PicWidthInCtbsY + ctbX                                           (30)
        NumCtuInSLice[ sliceIdx ]++
    }
```

It is a requirement of bitstream conformance that the values of NumCtuInSlice[i] for i ranging from 0 to num_slices_in_pic_minus1, inclusive, shall be greater than 0.

Additionally, it is a requirement of bitstream conformance that the matrix CtbAddrInSlice[i][j] for i ranging from 0 to num_slices_in_pic_minus1, inclusive, and j ranging from 0 to NumCtuInSlice[i]−1, inclusive, shall include all CTB addresses in the range 0 to PicSizeInCtbsY−1 once and only once.

The list CtbToSubPicIdx[ctbAddrRs] for ctbAddrRs ranging from 0 to PicSizeInCtbsY−1, inclusive, specifying the conversion from a CTB address in picture raster scan to a subpicture index, is derived as follows:

```
for( ctbAddrRs = 0; ctbAddrRs < PicSizeInCtbsY; ctbAddrRs++ ) {
    posX = ctbAddrRs % PicWidthInCtbsY
    posY = ctbAddrRs / PicWidthInCtbsY
    CtbToSubPicIdx[ ctbAddrRs ] = −1
    for( i = 0; CtbToSubPicIdx[ ctbAddrRs ] < 0 && i <=
sps_num_subpics_minus1; i++ ) {                                         (31)
        if( ( posX >= subpic_ctu_top_left_x[ i ] ) &&
            ( posX < subpic_ctu_top_left_x[ i ] +
              subpic_width_minus1[ i ] + 1 )
        &&
            ( posY >= subpic_ctu_top_left_y[ i ] ) &&
            ( posY < subpic_ctu_top_left_y[ i ] +
              subpic_height_minus1[ i ] + 1 ) )
            CtbToSubPicIdx[ ctbAddrRs ] = i
    }
}
```

The list NumSlicesInSubpic[i] and SliceSubpicToPicIdx[i][k], specifying the number of rectangular slices in the i-th subpicture and picture-level slice index of the k-th slice in the i-th subpicture, are derived is derived as follows:

```
for( j = 0; j <= sps_num_subpics_minus1; j++ )
    NumSlicesInSubpic[ j ] = 0
for( i = 0; i <= num_slices_in_pic_minus1; i++ ) {
    posX = CtbAddrInSlice[ i ][ 0 ] % PicWidthInCtbsY
    posY = CtbAddrInSlice[ i ][ 0 ] / PicWidthInCtbsY
    for( j = 0; j <= sps_num_subpics_minus1; j++ ) {
        if( ( posX >= subpic_ctu_top_left_x[ j ] ) &&              (32)
            ( posX < subpic_ctu_top_left_x[ j ] +
              subpic_width_minus1[ j ] + 1 )
        &&
            ( posY >= subpic_ctu_top_left_y[ j ] ) &&
            ( posY < subpic_ctu_top_left_y[ j ] +
              subpic_height_minus1[ j ] + 1 ) ) {
            SliceSubpicToPicIdx[ j ][ NumSlicesInSubpic[ j ] ] = i
            NumSlicesInSubpic[ j ]++
        }
    }
}
```

Currently, the DPS has a DPS ID, and there is no constraint on the corresponding relationship of the DPS NAL units content and the ID value.

And also, there is no constraint on the times that DPS could be in a bitstream. If there are many DPS in a bitstream, and they have the same DPS ID, the decoder does not know which DPS to choose.

The level signaled in the DPS should be the worst-case capability for the whole bitstream, so the level signaled in the DPS should not be less than the level signaled in the SPS.

There is currently no constraint on the TemporalId of the APS NAL unit and the TemporalId of the picture associated with picture header (PH). However, when nal_unit_type is equal to PPS_NUT, PREFIX_APS_NUT, or SUFFIX_APS_NUT, TemporalId shall be greater than or equal to the TemporalId of the PU containing the NAL unit and in the bitstream subtraction scenario, there should a constraint on the TemporalId of the APS NAL unit and the TemporalId of the picture associated with PH.

The tile relative variables tile_column_width_minus1[i], tile_row_height_minus1[i], tile_idx_delta[i] should have some constraints applied thereupon to ensure proper values of these variables because these variables of any tile cannot go beyond the picture range. And also, the tile column and the tile height should be larger than 0.

EMBODIMENTS

Option A: adding a constraint that DPS only can exist in a bitstream at most once. This means, DPS is not mandatory in a bitstream, and if a bitstream contains a DPS, only one DPS can be in the bitstream.

A DPS RBSP shall be available to the decoding process prior to it being referenced, included in at least one AU with TemporalId equal to 0 or provided through external means.

NOTE1—At most one DPS NAL unit exists in a bitstream.

NOTE2—DPS NAL unit is required to be available (either in the bitstream or by external means) to the decoding process prior to its being referenced. However, the DPS RBSP contains information that is not necessary for the operation of the decoding process specified in clauses 2 through 9 of this Specification.

Option B: adding a constraint that All DPS NAL units with a particular value of dps_decoding_parameter_set_id in a bitstream shall have the same content. In this case, one DPS ID cannot hook (correspond to) more than one DPS content.

For example:

A DPS RBSP shall be available to the decoding process prior to it being referenced, included in at least one AU with TemporalId equal to 0 or provided through external means.

NOTE1—DPS NAL units are required to be available (either in the bitstream or by external means) to the decoding process prior to their being referenced. However, the DPS RBSP contains information that is not necessary for the operation of the decoding process specified in clauses 2 through 9 of this Specification.

All DPS NAL units with a particular value of dps_decoding_parameter_set_id in a bitstream shall have the same content.

Adding a constraint that the level signaled in DPS should be no less than the level signaled in the SPS.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE1—A greater value of general_level_idc indicates a higher level. The maximum level signalled in the DPS for OlsInScope shall not be less than the level signalled in the SPS for a CVS contained within OlsInScope.

NOTE2—When OlsInScope conforms to multiple profiles, general_profile_idc should indicate the profile that provides the preferred decoded result or the preferred bitstream identification, as determined by the encoder (in a manner not specified in this Specification).

NOTE3—When the profile_tier_level( ) syntax structure is included in a DPS and CVSs of OlsInScope conform to different profiles, general_profile_idc and level_idc should indicate the profile and level for a decoder that is capable of decoding OlsInScope.

Constraint on the ALF NAL Unit pic_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to pic_alf_aps_id_luma[i] shall be equal to 1.

The TemporalId of the APS NAL unit having aps_params_type equal to ALF_APS and adaptation_parameter_set_id equal to pic_alf_aps_id_luma[i] shall be less than or equal to the TemporalId of the picture associated with PH.

pic_alf_aps_id_chroma specifies the adaptation_parameter_set_id of the ALF APS that the chroma component of the slices associated with the PH refers to.

The value of alf_chroma_filter_signal flag of the APS NAL unit having aps_params_type equal to ALF_APS and adaptation_parameter_set_id equal to pic_alf_aps_id_chroma shall be equal to 1.

The TemporalId of the APS NAL unit having aps_params_type equal to ALF_APS and adaptation_parameter_set_id equal to pic_alf_aps_id_chroma shall be less than or equal to the TemporalId of the picture associated with PH.

Constraint on the Tile Relative Variable

The tile relative variables tile_column_width_minus1[i], tile_row_height_minus1[i], tile_idx_delta[i] should have some constraints imposed thereupon to ensure proper values of the these variables.

Option A:

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with an index greater than or equal to num_exp_tile_columns_minus1 as specified in clause 6.5.1. The value of tile_column_width_minus1[i] shall be in a range of 0 to PicWidthInCtbsY−1, inclusive. When not present, the value of tile_column_width_minus1[0] is inferred to be equal to PicWidthInCtbsY−1.

For i in the range of 0 to num_exp_tile_columns_minus1−1, the sum of tile_column_width_minus1[i] shall be less than PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in a range of 0 to PicHeightInCtbsY−1, inclusive. When not present, the value of tilerow_height_minus1[0] is inferred to be equal to PicHeightInCtbsY−1. For i in the range of 0 to num_exp_tile_rows_minus1−1, the sum of tile_row_height_minus1[i] shall be less than PicHeightInCtbsY.

Option A':

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY.

Option B:

tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile idx_delta[i] is inferred to be equal to 0. In all other cases, the value of tile idx_delta[i] shall not be equal to 0. For i in the range of 0 to num_slices_in_pic_minus1−1, inclusive, the sum of tile_idx_delta[i] shall be less than NumTilesInPic.

Option C: Option A+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. The value of tile_column_width_minus1[i] shall be in a range of 0 to PicWidthInCtbsY−1, inclusive. When not present, the value of tile_column width_minus1[0] is inferred to be equal to PicWidthInCtbsY−1.

For i in the range of 0 to num_exp_tile_columns_minus1−1, the sum of tile_column_width_minus1[i] shall be less than PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in a range of 0 to PicHeightInCtbsY−1, inclusive. When not present, the value of tile_row_height_minus1[0] is inferred to be equal to PicHeightInCtbsY−1. For i in the range of 0 to num_exp_tile_rows_minus1−1, the sum of tile_row_height_minus1[i] shall be less than PicHeightInCtbsY.

tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile idx_delta[i] is inferred to be equal to 0. In all other cases, the value of tile idx_delta[i] shall not be equal to 0. For i in the range of 0 to num_slices_in_pic_minus1−1, the sum of tile_idx_delta[i] shall be less than NumTilesInPic.

Option C': Option A'+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY.

tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

Option D: (Alternative Method for Option A')

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1, inclusive, the sum of (tile_row_height_minus1[i]+1) shall be less than or equal to PicHeightInCtbsY.

Option E: Option D+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1, inclusive, the sum of (tile_row_height_minus1[i]+1) shall be less than or equal to PicHeightInCtbsY.

tile_idx_delta[i] specifies the difference in tile index between the i-th rectangular slice and the (i+1)-th rectangular slice. The value of tile idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

Option F: (Alternative Method for Option A')

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width_minus1[i]+1) shall be less than or equal to PicWidthInCtbsY. The value of tile_column_width_minus1[num_exp_tile_columns_minus1] shall be less than PicWidthInCtbsY tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY. The value of tile_row_height_minus1[num_exp_tile_rows_minus1] shall be less than PicHeightInCtbsY Option G: Option F+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width_minus1[i]+1) shall be less than or equal to PicWidthInCtbsY. The value of tile_column_width_minus1[num_exp_tile_columns_minus1] shall be less than PicWidthInCtbsY tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY. The value of tile_row_height_minus1[num_exp_tile_rows_minus1] shall be less than PicHeightInCtbsY tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

In the above, the description regarding two values M and N that "M shall be less than or equal to N" also can be described as: "M shall be no larger than N."

Different implementations of the present application are following:

The first embodiment [DPS ID]

Currently, the DPS has a DPS ID, there is no constraint on the corresponding relationship of the DPS NAL units content and the ID value.

Also, there is no constraint on the times that the DPS could be in a bitstream. If there are many DPS in a bitstream, and they have the same DPS ID, the decoder does not know which DPS to choose.

Two options are provided to handle this problem:

Option A: adding a constraint that the DPS can only exist in a bitstream at most once, which means, DPS is not mandatory in a bitstream, and if a bitstream contains a DPS, only one DPS can be in the bitstream.

A DPS RBSP shall be available to the decoding process prior to it being referenced, included in at least one AU with TemporalId equal to 0 or provided through external means.

NOTE1—At most one DPS NAL unit exists in a bitstream.

NOTE2—DPS NAL unit is required to be available (either in the bitstream or by external means) to the decoding process prior to being referenced. However, the DPS RBSP contains information that is not necessary for the operation of the decoding process specified in clauses 2 through 9 of this Specification.

Option B: adding a constraint that All DPS NAL units with a particular value of dps_decoding_parameter_set_id in a bitstream shall have the same content. In this case, one DPS ID cannot hook (correspond to) more than one DPS content.

For example:

A DPS RBSP shall be available to the decoding process prior to it being referenced, included in at least one AU with TemporalId equal to 0 or provided through external means.

NOTE1—DPS NAL units are required to be available (either in the bitstream or by external means) to the decoding process prior to being referenced. However, the DPS RBSP contains information that is not necessary for the operation of the decoding process specified in clauses 2 through 9 of this Specification.

All DPS NAL units with a particular value of dps_decoding_parameter_set_id in a bitstream shall have the same content.

The second embodiment [DPS level]

The level signaled in the DPS should be or represent the worst-case capability for the whole bitstream, so the level signaled in the DPS should be no less than the level signaled in the SPS.

A constraint can be imposed that the level signaled in DPS should not be less than the level signaled in SPS.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE1—A greater value of general_level_idc indicates a higher level. The maximum level signalled in the DPS for OlsInScope shall not be less than than the level signalled in the SPS for a CVS contained within OlsInScope.

NOTE2—When OlsInScope conforms to multiple profiles, general_profile_idc should indicate the profile that provides the preferred decoded result or the preferred bitstream identification, as determined by the encoder (in a manner not specified in this Specification).

NOTE3—When the profile_tier_level( ) syntax structure is included in a DPS and CVSs of OlsInScope conform to different profiles, general_profile_idc and level_idc should indicate the profile and level for a decoder that is capable of decoding OlsInScope The third embodiment [tid of ALF nalu]

There is currently no constraint on the TemporalId of the APS NAL unit and the TemporalId of the picture associated with PH. However, when nal_unit_type is equal to PPS_NUT, PREFIX_APS_NUT, or SUFFIX_APS_NUT, TemporalId shall be greater than or equal to the TemporalId of the PU containing the NAL unit and when in bitsteam subtraction scenario, there should a constraint on the TemporalId of the APS NAL unit and the TemporalId of the picture associated with PH.

Constraint on the ALF NAL Unit pic_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to pic_alf_aps_id_luma[i] shall be equal to 1.

The TemporalId of the APS NAL unit having aps_params_type equal to ALF_APS and adaptation_parameter_set_id equal to pic_alf_aps_id_luma[i] shall be less than or equal to the TemporalId of the picture associated with PH.

pic_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to pic_alf_aps_id_chroma shall be equal to 1.

The TemporalId of the APS NAL unit having aps_params_type equal to ALF_APS and adaptation_parameter_set_id equal to pic_alf_aps_id_chroma shall be less than or equal to the TemporalId of the picture associated with PH.

The fourth embodiment [tile]

The tile relative variables tile_column_width_minus1[i], tile_row_height_minus1[i], tile_idx_delta[i] should have some constraints imposed thereupon to ensure proper values of these variables.

This is because these variables of any tile cannot go beyond the picture range. And also, the tile column and the tile height should be larger than 0.

Option A:

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] shall be in a range of 0 to PicWidthInCtbsY−1, inclusive. When not present, the value of tile_colunm_width_minus1[0] is inferred to be equal to PicWidthInCtbsY−1. For i in the range of 0 to num_exp_tile_columns_minus1−1, the sum of tile_column width_minus1[i] shall be less than PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in a range of 0 to PicHeightInCtbsY−1, inclusive. When not present, the value of tile_row_height_minus1[0] is inferred to be equal to PicHeightInCtbsY−1. For i in the range of 0 to num_exp_tile_rows_minus1−1, the sum of tile_row_height_minus1[i] shall be less than PicHeightInCtbsY.

Option A':

tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns minus1 as specified in clause 6.5.1. When not present, the value of tile_column_width_minus1[0] is inferred to be equal to PicWidthInCtbsY−1. For i in the range of 0 to num_exp_tile_columns_minus1−1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY.

Option B:

To make sure the rectangular slice should be contained in the picture.

tile_idx_delta[i] specifies the difference in tile index between the i-th rectangular slice and the (i+1)-th rectangular slice. The value of tile idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

Option C: Option A+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] shall be in a range of 0 to PicWidthInCtbsY−1, inclusive. When not present, the value of tile_column_width_minus1[0] is inferred to be equal to PicWidthInCtbsY−1. For i in the range of 0 to num_exp_tile_columns minus1−1, the sum of tile_column_width_minus1[i] shall be less than PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in a range of 0 to PicHeightInCtbsY−1, inclusive. When not present, the value of tile_row_height_minus1[0] is inferred to be equal to PicHeightInCtbsY−1. For i in the range of 0 to num_exp_tile_rows_minus1−1, the sum of tile_row_height_minus1[i] shall be less than PicHeightInCtbsY.

tile_idx_delta[i] specifies the difference in tile index between the i-th rectangular slice and the (i+1)-th rectangular slice. The value of tile idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, the sum of tile_idx_delta[i] shall less than NumTilesInPic.

Option C': Option A'+Option B tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1. For i in the range of 0 to num_exp_tile_columns_minus1−1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY.

tile_idx_delta[i] specifies the difference in tile index between the i-th rectangular slice and the (i+1)-th rectangular slice. The value of tile idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

Option D: (Alternative Method for Option A')
tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_colum width_minus1[0] is inferred to be equal to PicWidthInCtbsY−1.

For i in the range of 0 to num_exp_tile_columns_minus1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1, inclusive, the sum of (tile_row_height_minus1[i]+1) shall be less than or equal to PicHeightInCtbsY.

Option E: Option D+Option B
tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1, inclusive, the sum of (tile_column_width_minus1[i]+1) shall be less than or equal to PicWidthInCtbsY.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1, inclusive, the sum of (tile_row_height_minus1[i]+1) shall be less than or equal to PicHeightInCtbsY.

tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall be less than NumTilesInPic.

Option F: (Alternative Method for Option A')
tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width minus1[i]+1) shall be less than or equal to PicWidthInCtbsY. The value of tile_column_width_minus1[num_exp_tile_columns_minus1] shall be less than PicWidthInCtbsY tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile row_height_minus1[i]+1) shall be less than or equal to PicHeightInCtbsY. The value of tile_row_height_minus1[num_exp_tile_rows_minus1] shall be less than PicHeightInCtbsY Option G: Option F+Option B
tile_column_width_minus1[i] plus 1 specifies the width of the i-th tile column in units of CTBs for i in the range of 0 to num_exp tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. When not present, the value of tile_column_width_minus1[0] is inferred to be equal to PicWidthInCtbsY−1.

For i in the range of 0 to num_exp_tile_columns_minus1−1, inclusive, the sum of (tile_column_width minus1[i]+1) shall be less than or equal to PicWidthInCtbsY. The value of tile_column_width_minus1[num_exp_tile_columns_minus1] shall be less than PicWidthInCtbsY tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. When not present, the value of tile_row_height_minus1[0] is inferred to be equal to PicHeightInCtbsY−1. For i in the range of 0 to num_exp_tile_rows_minus1−1, inclusive, the sum of (tile_row_height_minus1[i]+1) shall be less than or equal to PicHeightInCtbsY. The value of tile_row_height_minus1[num_exp_tile_rows_minus1] shall be less than PicHeightInCtbsY tile_idx_delta[i] specifies the difference in tile index between the i-th rectangular slice and the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. In all other cases, the value of tile_idx_delta[i] shall not be equal to 0. For i in the range of 0 to num_slices_in_pic_minus1−1, inclusive, the sum of tile_idx_delta[i] shall less than NumTilesInPic.

In the above, the description regarding two values M and N that "M shall less than or equal to N" also can be described as "M shall be no larger than N."

The constraint that DPS can exist in a bitstream at most once and the mechanism in another method that if a bitstream can have more than one DPS, then All DPS NAL units with a particular value of dps_decoding_parameter_set_id in a bitstream shall have the same content reduces or eliminates the ambiguiity at the decoder.

The level signaled in the DPS should be the worst-case capability for the whole bitstream, so the level signaled in the DPS should not be less than the level signaled in the SPS. Otherwise, the parameter in the DPS would not make sense.

The constraint on the TID of ALF NALU is added to ensure the bitstream subtraction work properly, according to the TID of NALU.

From the conformance point of view: the tile relative variable should be constrained in a valid range, to ensure that each tile has one CTU at least, and each tile should be included by the picture. Also, to make sure the rectangular slice should be contained in the picture.

Following is an explanation of the applications of the encoding method as well as the decoding method as shown in the above-mentioned embodiments, and a system using them.

FIG. 6 is a block diagram showing a content supply system for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. Examples of the communication link 3104 include, but are not limited to, WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. Examples of the capture device 3102 include, but are not limited to, a camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 7:
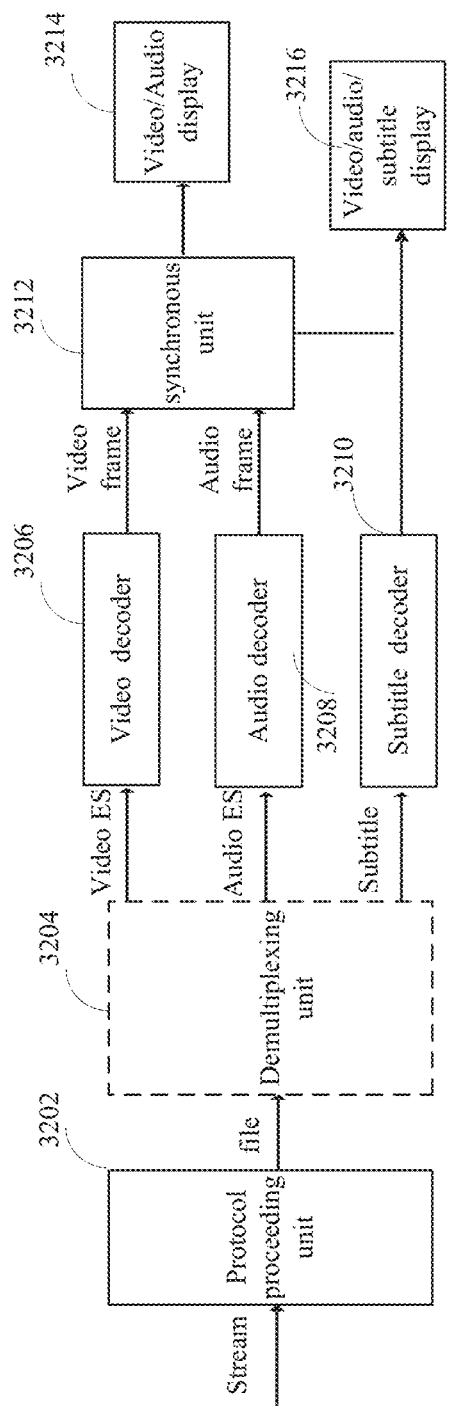
FIG. 7 is a block diagram showing a structure of an example of a terminal device.

FIG. 7 is a diagram showing a structure of an example of the terminal device 3106. After the terminal device 3106 receives stream from the capture device 3102, the protocol proceeding unit 3202 analyzes the transmission protocol of the stream. Examples of the protocol include, but are not limited to, Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, in some scenarios, for example in the video conference system, the encoded audio data and the encoded video data are not multiplexed. In this situation, the encoded data is transmitted to video decoder 3206 and audio decoder 3208 without going through the demultiplexing unit 3204.

Via the demultiplexing processing, video elementary stream (ES), audio ES, and optionally subtitle are generated. The video decoder 3206, which includes the video decoder 30 as explained in the above-mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212.

Alternatively, the video frame may be stored in a buffer (not shown in FIG. 7) before being fed to the synchronous unit 3212. Similarly, the audio frame may be stored in a buffer (not shown in FIG. 7) before being fed to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

Embodiments of the present disclosure are not limited to the above-mentioned system, and either the picture encoding device or the picture decoding device in the above-mentioned embodiments can be incorporated into other systems, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>=Greater than or equal to
<Less than
<=Less than or equal to
==Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
=Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+=Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \,\&\&\, y >= 0 \\ Atan\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

Clip1$_Y$(x)=Clip3(0,(1<<BitDepth$_Y$)−1, x)

Clip1$_C$(x)=Clip3(0,(1<<BitDepth$_C$)−1, x)

$$Clip3(x, y, z) = \begin{cases} x; & z < x \\ y: & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x− −" |
| "!x", "−x" (as a unary prefix operator) |
| $x^y$ |
| "x * y", "x / y", "x ÷ y", "%", "x % y" |
| "x +y", "x − y" (as a two-argument operator), " |
| $\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x..y" |
| "x = y", "x += y", "x −= y" |

Text description of logical operations

In the text, a statement of logical operations as would be described mathematically in the following form:

if(condition 0)
        statement 0
    else if(condition 1)
        statement 1
    . . . .
    else /* informative remark on remaining condition */statement n may be described in the following manner:

. . . as follows/ . . . the following applies:
    If condition 0, statement 0
    Otherwise, if condition 1, statement 1
    Otherwise (informative remark on remaining condition), statement n
    . . . .

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise . . . ". Interleaved "If . . . Otherwise, if . . . Otherwise, . . .

"statements can be identified by matching" . . . as follows" or " . . . the following applies" with the ending "Otherwise, . . . ".

In the text, a statement of logical operations as would be described mathematically in the following form:

if(condition 0a && condition 0b)
    statement 0
else if(condition 1a||condition 1b)
    statement 1
. . . .
else
    statement n may be described in the following manner:
    . . . as follows/ . . . the following applies:
    If all of the following conditions are true, statement 0:
        condition 0a
        condition 0b
    Otherwise, if one or more of the following conditions are true, statement 1:
        condition 1a
        condition 1b
    . . . .
    Otherwise, statement n In the text, a statement of logical operations as would be described mathematically in the following form:

if(condition 0)
    statement 0
if(condition 1)
    statement 1 may be described in the following manner:
    When condition 0, statement 0
    When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates the transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 8:
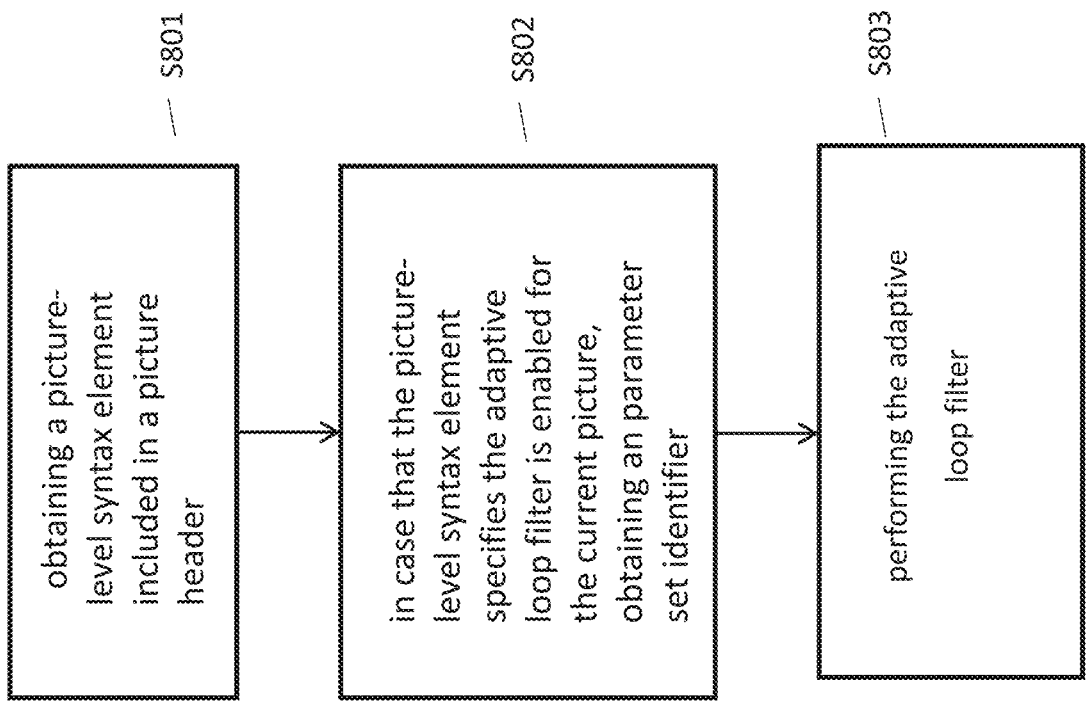
FIG. 8 is a flow diagram of a decoding method according to one embodiment.

In particular, it is provided a method of decoding a coded video bitstream implemented in a decoder as illustrated in FIG. 8, the method comprising: operation S801, obtaining a picture-level syntax element included in a picture header of the current picture by parsing the video bitstream, wherein the picture-level syntax element (e.g. pic_alf_enabled_flag) is used to specify whether an adaptive loop filter (ALF) is enabled for the current picture. Operation S802; in case that the picture-level syntax element specifies the adaptive loop filter is enabled for the current picture, obtaining a parameter set identifier (e.g. pic_alf_aps_id_luma[i]) included in the picture header, wherein the parameter set identifier is used to indicate a first parameter set (e.g. an APS) comprising a set of ALF parameters, and wherein a temporal identifier (e.g. TemporalId) of the first parameter set is less than or equal to a temporal identifier of the current picture; and operation S803, performing the adaptive loop filter on at least one slice of the current picture based on the first parameter set.

The current picture is a coded picture contained in a picture unit (PU), wherein the PU is set of NAL units that are associated with each other according to a specified classification rule, are consecutive in decoding order.

A network abstraction layer (NAL) unit is syntax structure containing an indication of the type of data to follow and bytes containing that all or part of encoded data of the current picture, the picture header, or the parameter set comprising a set of ALF parameter. Wherein each NAL unit has a temporal identifier.

A temporal identifier (e.g. TemporalId) of the first parameter set is the TemporalId of the APS NAL unit having aps_params_type equal to ALF_APS. aps_params_type equal to ALF_APS means that ALF parameters are carried in the APS. The APS NAL unit is a NAL unit comprising the APS.

If the temporal identifier of a first NAL unit is less than the temporal identifier of a second NAL unit of the same layer, data encapsulated by the first NAL unit may be decoded without reference to data encapsulated by the second NAL unit. The temporal identifier could be also used in sub-bitstream extraction process, which is a process by which NAL units in a bitstream that do not belong to a target set, determined by a target highest temporal identifier, are removed from the bitstream, with the output sub-bitstream consisting of the NAL units in the bitstream that belong to the target set.

A temporal identifier could be related to a decoding order.

Performing the adaptive loop filter on at least one slice of the current picture based on the first parameter set comprises: performing adaptive loop filter on the luma component of at least one slice of the current picture based on the first parameter set.

when ALF is enabled for a CTB, each sample $R(i,j)$ within the CU is filtered using ALF, resulting in sample value $R'(i,j)$ as shown below, $$R'(i, j) = R(i, j) + \left(\left(\sum_{k \neq 0}\sum_{l \neq 0} f(k, l) \times K(R(i + k, j + l) - R(i, j), c(k, l)) + 64\right) >> 7\right)$$

where f(k,l) denotes the decoded filter coefficients, K(x,y) is the clipping function and c(k,l) denotes the decoded clipping parameters. The variable k and l varies between −L/2 and L/2 where L denotes the filter length. The clipping function K(x,y)=min (y, max(−y,x)) which corresponds to the function Clip3 (−y,y,x). The clipping operation introduces non-linearity to make ALF more efficient by reducing the impact of neighbor sample values that are too different with the current sample value.

ALF filter parameters (or ALF parameters) are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In picture header, the indices of the APSs used for the current picture are signaled.

Clipping value indexes, which are decoded from the APS, allow determining clipping values using a table of clipping values for both luma and Chroma components. These clipping values are dependent of the internal bitdepth. More precisely, the clipping values are obtained by the following formula:

$$AlfClip=\{round(2^{B-\alpha*n}) \text{ for } n \in [0 \ldots N-1]\}$$

with B equal to the internal bitdepth, a is a pre-defined constant value equal to 2.35, and N equal to 4 which is the number of allowed clipping values in VVC. The AlfClip is then rounded to the nearest value with the format of power of 2.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

The method may further comprise: in case that the picture-level syntax element (e.g. pic_alf_enabled_flag) specifies the adaptive loop filter is enabled for the current picture, obtaining another parameter set identifier included in the picture header, wherein the parameter set identifier (e.g. pic_alf_aps_id_chroma) is used to indicate a second parameter set (e.g. an APS) comprising a set of ALF parameters, and wherein a temporal identifier of the second parameter set is less than or equal to a temporal identifier of the current picture; and performing adaptive loop filter on the chroma component of at least one slice of the current picture based on the second parameter set.

Figure 9:
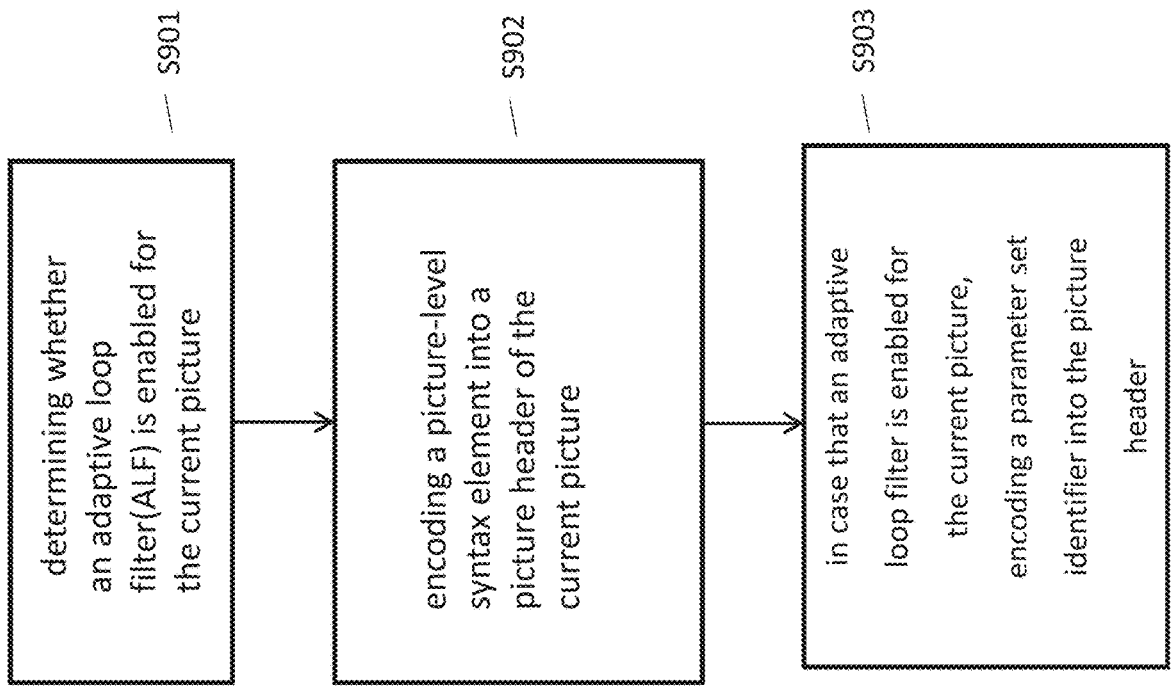
FIG. 9 is a flow diagram of an encoding method according to one embodiment.

Similarly, it is provided a method of encoding a video bitstream comprising coded data implemented in an encoder as illustrated in FIG. 9. The method comprises: operation S901, determining whether an adaptive loop filter (ALF) is enabled for the current picture. Operation S902, encoding a picture-level syntax element (e.g. pic_alf_enabled_flag) into a picture header of the current picture based on the determining whether an adaptive loop filter (ALF) is enabled for the current picture, wherein the picture-level syntax element is used to specify whether an adaptive loop filter (ALF) is enabled for the current picture, and operation S903, in case that an adaptive loop filter is enabled for the current picture, encoding a parameter set identifier (e.g. pic_alf_aps_id_luma[i]) into the picture header, wherein the parameter set identifier is used to indicate a first parameter set (e.g. an APS) comprising a set of ALF parameters of an adaptive loop filter, and wherein a temporal identifier (e.g. TemporalId) of the first parameter set is set to be less than or equal to a temporal identifier of the current picture.

The method may further comprise: encoding the temporal identifier of the first parameter set and the temporal identifier of the current picture into the video bitstream.

The first parameter set comprises a set of ALF parameters of an adaptive loop filter performed on the luma component of at least one slice of the current picture.

The method may further comprise: in case that the picture-level syntax element specifies the adaptive loop filter is enabled for the current picture, encoding another parameter set identifier into the picture header, wherein the parameter set identifier (e.g. pic_alf_aps_id_chroma) is used to indicate a second parameter set (e.g. an APS) comprising a set of ALF parameters of an adaptive loop filter performed on the chroma component of at least one slice of the current picture, and wherein a temporal identifier of the second parameter set is set to be less than or equal to a temporal identifier of the current picture.

Figure 10:
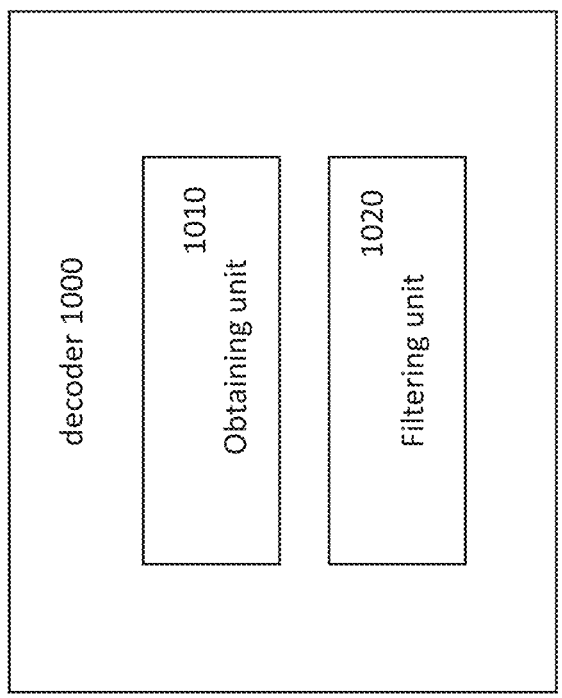
FIG. 10 is a schematic diagram of an encoder according to one embodiment.

FIG. 10 illustrates a decoder 1000 configured for decoding a video bitstream comprising coded data for a plurality of pictures. The decoder 1000 according to the shown example comprises: an obtaining unit 1010 configured to obtain a picture-level syntax element included in a picture header of the current picture by parsing the video bitstream, wherein the picture-level syntax element is used to specify whether an adaptive loop filter (ALF) is enabled for the current picture. The obtaining unit 1010 is further configured to obtain, in case that the picture-level syntax element specifies the adaptive loop filter is enabled for the current picture, a parameter set identifier included in the picture header, wherein the parameter set identifier is used to indicate a first parameter set comprising a set of ALF parameters, and wherein a temporal identifier of the first parameter set is less than or equal to a temporal identifier of the current picture; and a filtering unit 1020 configured to perform the adaptive loop filter on at least one slice of the current picture based on the first parameter set.

The obtaining unit 1010 may be entropy decoding unit 304. The filtering unit 1020 may be loop filter 320. The decoder 1000 may be the destination device 14, the decoder 30, the apparatus 500, the video decoder 3206, or the terminal device 3106.

Figure 11:
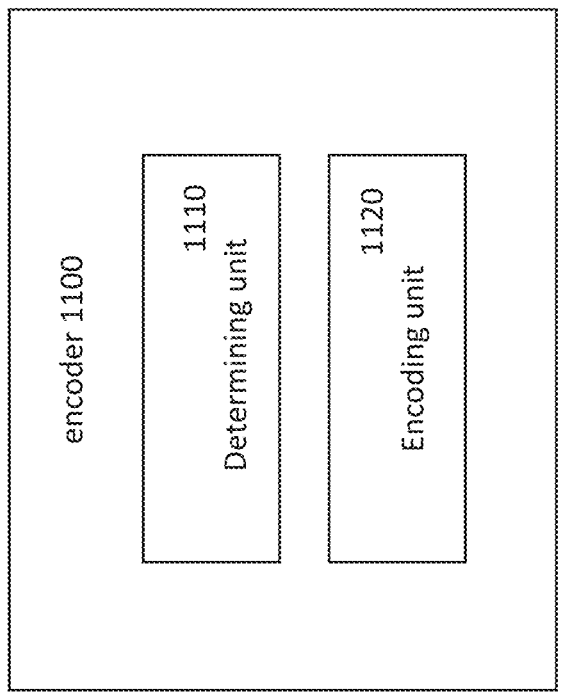
FIG. 11 is a schematic diagram of a decoder according to one embodiment.

Similarly, it is provided an encoder 1100 configured for encoding a video bitstream comprising coded data for a plurality of pictures as illustrated in FIG. 11. The encoder 1100 comprises: a determining unit 1110 configured to determine whether an adaptive loop filter (ALF) is enabled for the current picture, an encoding unit 1120 configured to encode a picture-level syntax element into a picture header of the current picture based on the determining whether an adaptive loop filter (ALF) is enabled for the current picture, wherein the picture-level syntax element is used to specify whether an adaptive loop filter (ALF) is enabled for the current picture. The encoding unit 1120 is further configured to encode, in case that an adaptive loop filter is enabled for the current picture, a parameter set identifier into the picture header, wherein the parameter set identifier is used to indicate a first parameter set comprising a set of ALF parameters of an adaptive loop filter, and wherein a temporal identifier of the first parameter set is set to be less than or equal to a temporal identifier of the current picture.

The encoding unit 1120 may be an entropy encoding unit 270. The determining unit 1110 may be a loop filter 220. The encoder 1100 may be the source device 12, the encoder 20, or the apparatus 500.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for decoding of a video bitstream comprising:
   obtaining a picture-level syntax element included in a picture header of a current picture by parsing the video bitstream, wherein the picture-level syntax element is used to specify whether an adaptive loop filter_(ALF) is enabled for the current picture, wherein the video bitstream includes data representing the current picture;
   when the picture-level syntax element specifies the adaptive loop filter is enabled for the current picture, obtaining a first parameter set identifier included in the picture header, wherein the first parameter set identifier is used to indicate a first parameter set comprising a set of ALF parameters, and wherein a temporal identifier of the first parameter set is less than or equal to a temporal identifier of the current picture; and
   performing the adaptive loop filter on at least one slice of the current picture based on the first parameter set.

2. The method of claim 1, wherein the performing the adaptive loop filter on at least one slice of the current picture based on the first parameter set comprises:
   performing adaptive loop filter on a luma component of at least one slice of the current picture based on the first parameter set.

3. The method of claim 2, wherein the method further comprises:
   when the picture-level syntax element specifies the adaptive loop filter is enabled for the current picture, obtaining a second parameter set identifier included in the picture header,
   wherein the second parameter set identifier is used to indicate a second parameter set comprising a set of ALF parameters, and wherein a temporal identifier of the second parameter set is less than or equal to the temporal identifier of the current picture; and
   performing adaptive loop filter on a chroma component of at least one slice of the current picture based on the second parameter set.

4. A method for encoding of a video bitstream comprising:
   determining whether an adaptive loop filter_(ALF) is enabled for a current picture,
wherein the video bitstream includes data representing the current picture;
   encoding a picture-level syntax element into a picture header of the current picture based on the determining whether an adaptive loop filter_(ALF) is enabled for the current picture,
   wherein the picture-level syntax element is used to specify whether an adaptive loop filter_(ALF) is enabled for the current picture; and
   when an adaptive loop filter is enabled for the current picture, encoding a first parameter set identifier into the picture header, wherein the first parameter set identifier is used to indicate a first parameter set comprising a set of ALF parameters of an adaptive loop filter, and wherein a temporal identifier of the first parameter set is set to be less than or equal to a temporal identifier of the current picture.

5. The method of claim 4, wherein the method further comprises: encoding the temporal identifier of the first parameter set and the temporal identifier of the current picture into the video bitstream.

6. The method of claim 4, wherein the first parameter set comprises a set of ALF parameters of an adaptive loop filter performed on a luma component of at least one slice of the current picture.

7. The method of claim 6, wherein the method further comprises:
   when the picture-level syntax element specifies the adaptive loop filter is enabled for the current picture, encoding a second parameter set identifier into the picture header, wherein the second parameter set identifier is used to indicate a second parameter set comprising a set of ALF parameters of an adaptive loop filter performed on a chroma component of at least one slice of the current picture, and wherein a temporal identifier of the second parameter set is set to be less than or equal to the temporal identifier of the current picture.

8. A decoder, comprising:
one or more processors; and
a non-transitory computer-readable storage medium coupled to the processors and storing programming for execution by the processors, wherein the programming, when executed by the processors, configures the decoder to:
obtain a picture-level syntax element included in a picture header of a current picture by parsing a video bitstream, wherein the picture-level syntax element is used to specify whether an adaptive loop filter_ (ALF) is enabled for the current picture;
when the picture-level syntax element specifies the adaptive loop filter is enabled for the current picture, obtain a first parameter set identifier included in the picture header, wherein the first parameter set identifier is used to indicate a first parameter set comprising a set of ALF parameters, and wherein a temporal identifier of the first parameter set is less than or equal to a temporal identifier of the current picture; and
perform the adaptive loop filter on at least one slice of the current picture based on the first parameter set.

9. The decoder of claim 8, wherein the perform the adaptive loop filter on at least one slice of the current picture based on the first parameter set comprises: perform adaptive loop filter on a luma component of at least one slice of the current picture based on the first parameter set.

10. The decoder of claim 9, wherein the decoder further configured to:
when the picture-level syntax element specifies the adaptive loop filter is enabled for the current picture, obtain a second parameter set identifier included in the picture header,
wherein the second parameter set identifier is used to indicate a second parameter set comprising a set of ALF parameters, and wherein a temporal identifier of the second parameter set is less than or equal to the temporal identifier of the current picture; and
performing adaptive loop filter on a chroma component of at least one slice of the current picture based on the second parameter set.

11. A non-transitory storage medium which includes an encoded bitstream decoded by an image decoding device, the encoded bitstream being generated by dividing a current picture of a video signal or an image signal into a plurality blocks, and
comprising a plurality of syntax elements, wherein the plurality of syntax elements comprises a picture-level syntax element included in a picture header of the current picture by parsing a video bitstream, wherein the picture-level syntax element is used to specify whether an adaptive loop filter_(ALF) is enabled for the current picture; when the picture-level syntax element specifies the adaptive loop filter is enabled for the current picture, the encoded bitstream further comprises a first-parameter set identifier included in the picture header, wherein the first parameter set identifier is used to indicate a first parameter set comprising a set of ALF parameters, and wherein a temporal identifier of the first parameter set is set to be less than or equal to a temporal identifier of the current picture.

* * * * *